(12) United States Patent
Kujawa et al.

(10) Patent No.: US 10,940,774 B2
(45) Date of Patent: Mar. 9, 2021

(54) ADJUSTING DEVICE FOR LONGITUDINAL ADJUSTMENT OF A VEHICLE SEAT, METHOD FOR ASSEMBLY THEREOF AND GUIDE PIECE

(71) Applicant: Brose Fahrzeugteile GmbH & Co. KG, Coburg, Coburg (DE)

(72) Inventors: Ronald Kujawa, Sterling Heights, MI (US); Leo Ioppolo, Washington, MI (US)

(73) Assignee: Brose Fahrzeugteile SE & Co. KG (Coburg), Coburg (DE)

( * ) Notice: Subject to any disclaimer, the term of this patent is extended or adjusted under 35 U.S.C. 154(b) by 120 days.

(21) Appl. No.: 16/417,738

(22) Filed: May 21, 2019

(65) Prior Publication Data

US 2020/0369182 A1    Nov. 26, 2020

(51) Int. Cl.
*B60N 2/07* (2006.01)
*B60N 2/08* (2006.01)
*B60N 2/075* (2006.01)

(52) U.S. Cl.
CPC ............ *B60N 2/0727* (2013.01); *B60N 2/08* (2013.01); *B60N 2/071* (2013.01); *B60N 2/072* (2013.01); *B60N 2/0818* (2013.01)

(58) Field of Classification Search
CPC ........ B60N 2/0727; B60N 2/08; B60N 2/071; B60N 2/0818; B60N 2/072
See application file for complete search history.

(56) References Cited

U.S. PATENT DOCUMENTS

| | | | |
|---|---|---|---|
| 7,097,250 B2 | 8/2006 | Rausch et al. | |
| 7,578,555 B2 | 8/2009 | Hofmann et al. | |
| 8,141,953 B2* | 3/2012 | Quast .................. | B60N 2/0806 |
| | | | 297/341 |
| 9,919,622 B2* | 3/2018 | Tame ................... | B60N 2/0722 |
| 10,046,674 B1 | 8/2018 | Ferenc et al. | |
| 10,160,350 B2* | 12/2018 | Ioppolo ............... | B60N 2/0705 |
| 2004/0164600 A1* | 8/2004 | Rausch ................ | B60N 2/123 |
| | | | 297/344.1 |
| 2009/0134681 A1 | 5/2009 | Quast et al. | |
| 2013/0075571 A1 | 3/2013 | Suck et al. | |
| 2018/0086233 A1* | 3/2018 | Harris ................. | B60N 2/0705 |
| 2020/0331363 A1* | 10/2020 | Dicicco ............... | B60N 2/075 |

FOREIGN PATENT DOCUMENTS

CN        208630409     *   3/2019

* cited by examiner

*Primary Examiner* — Tan Le
(74) *Attorney, Agent, or Firm* — Renner, Otto, Boisseile & Sklar, LLP

(57) ABSTRACT

An adjusting device for longitudinal adjustment of a vehicle seat comprising a first rail and a second rail movably guided in a longitudinal direction relative to the first rail includes a guide piece mounted to a side-wall of the first rail, comprising a main body, a plurality of connecting devices for connecting to the first rail, and a positioning device locked in a positioning recess, for positioning the guide piece with respect to the first rail in the longitudinal direction. The connecting devices are formed as hook-like members that are inserted through the locking recesses and grip behind the side-wall to fix guide piece to the first rail. The guide piece comprises a flexible portion connected to the positioning device and the main body, which is configured to bend in a transverse direction when mounting the guide piece to the first rail and to be locked in the positioning recess.

21 Claims, 21 Drawing Sheets

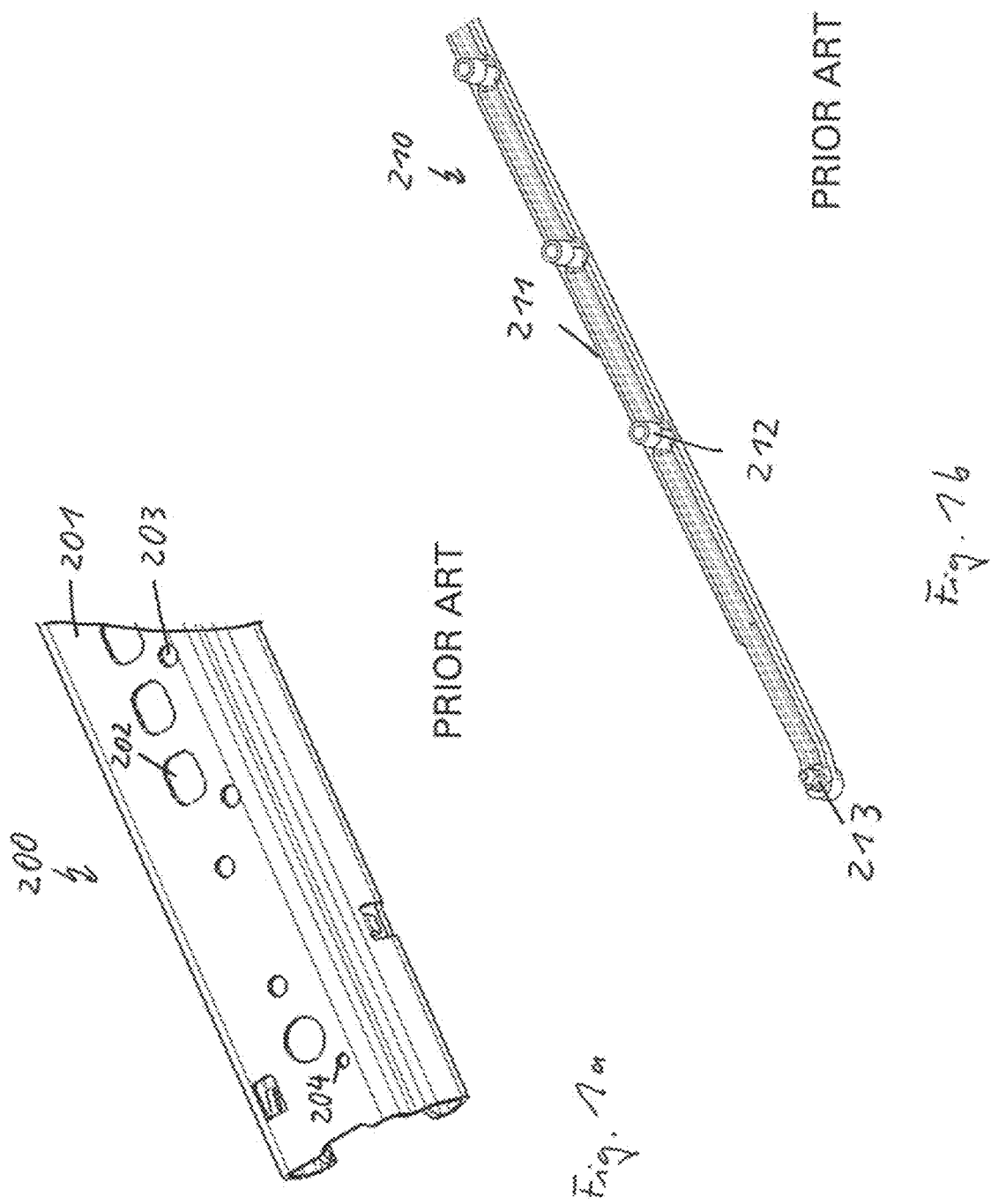

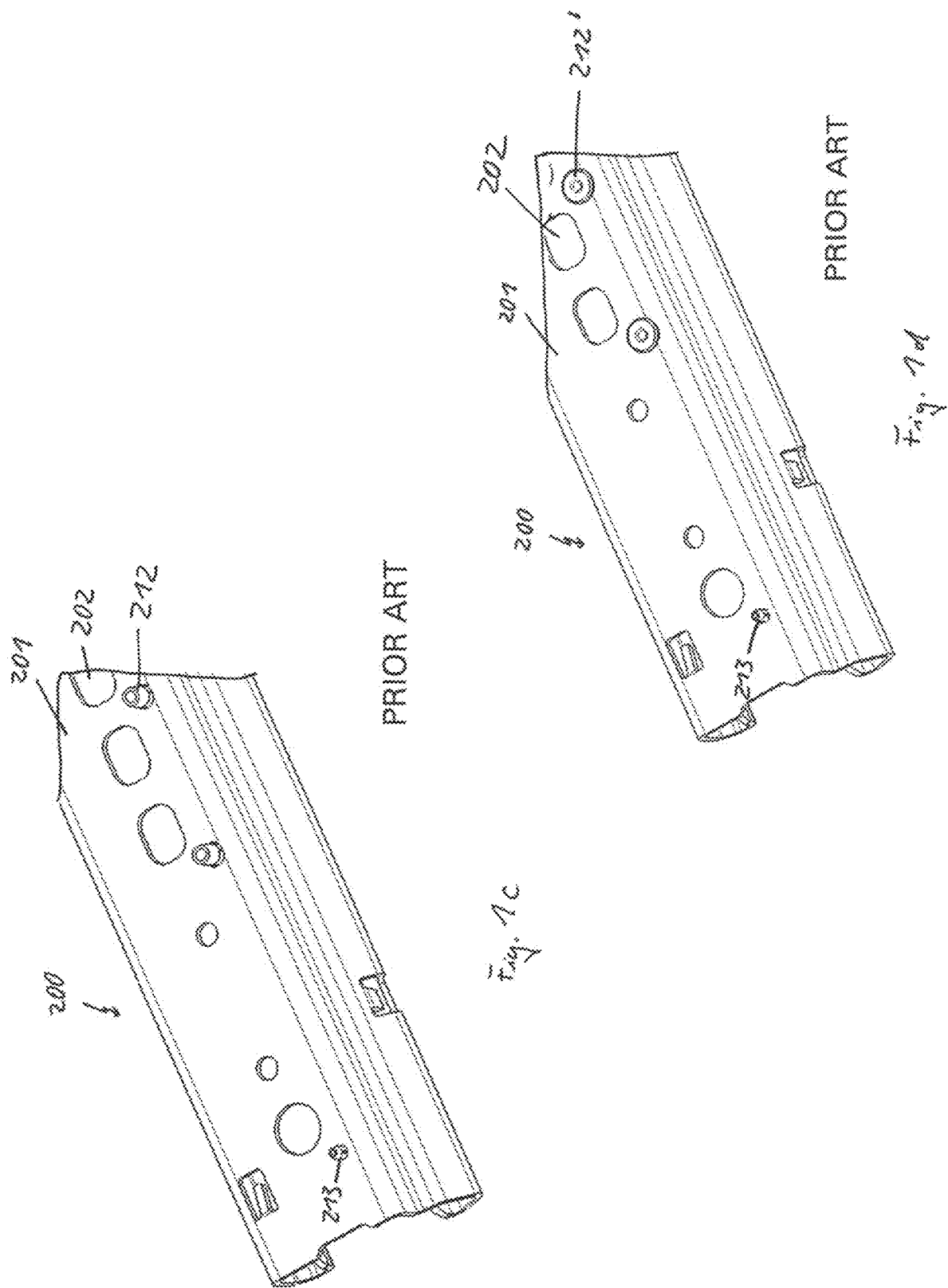

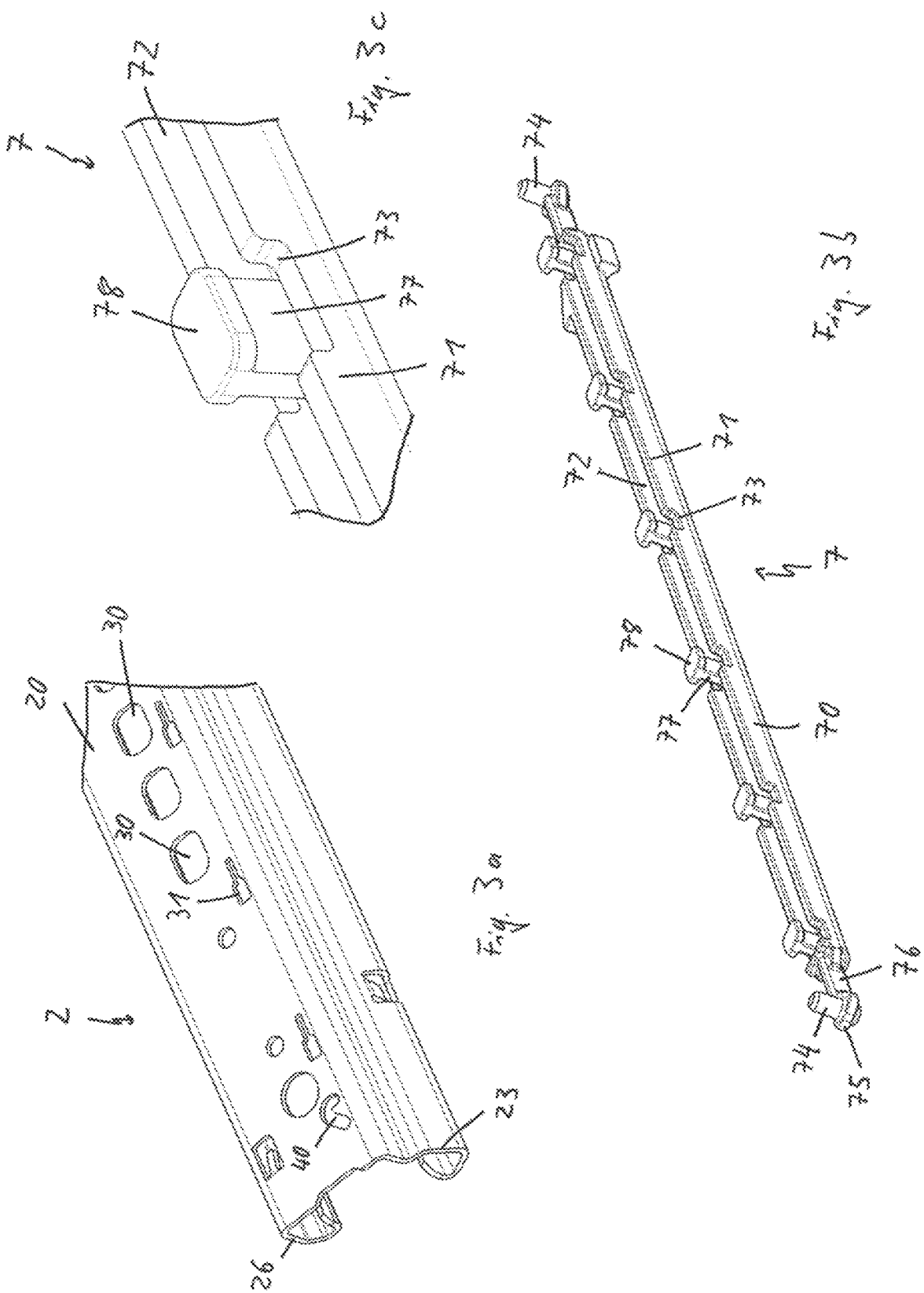

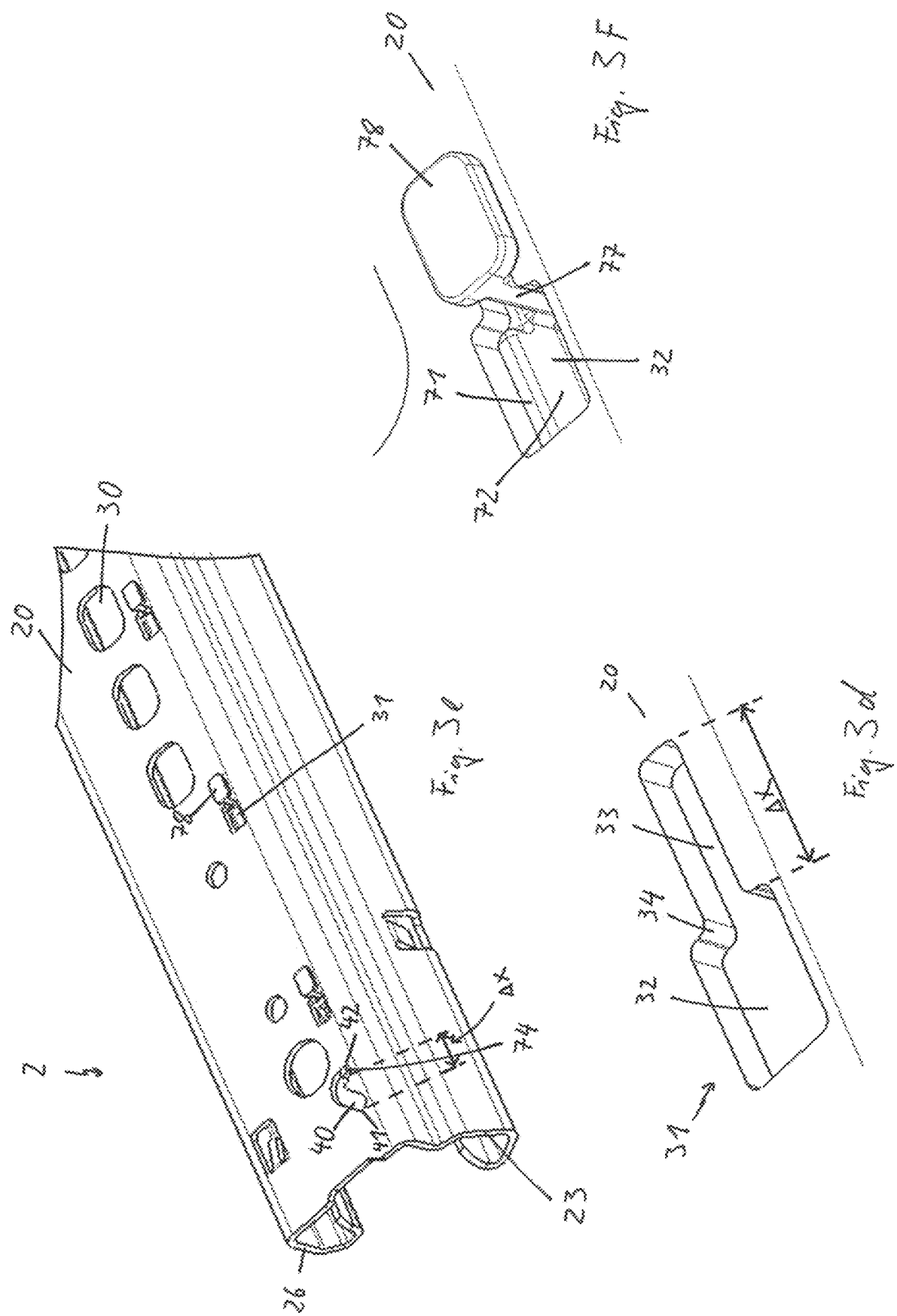

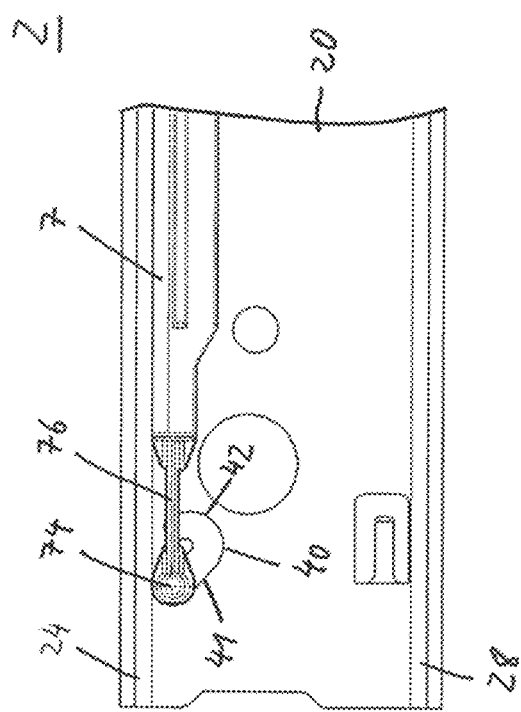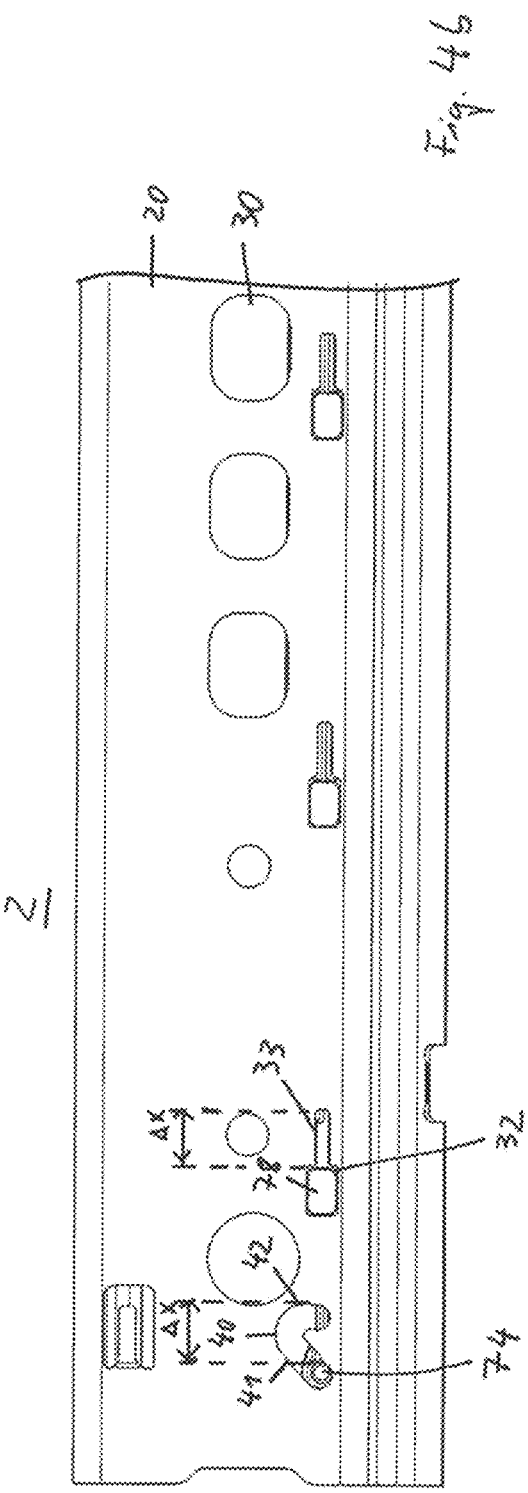

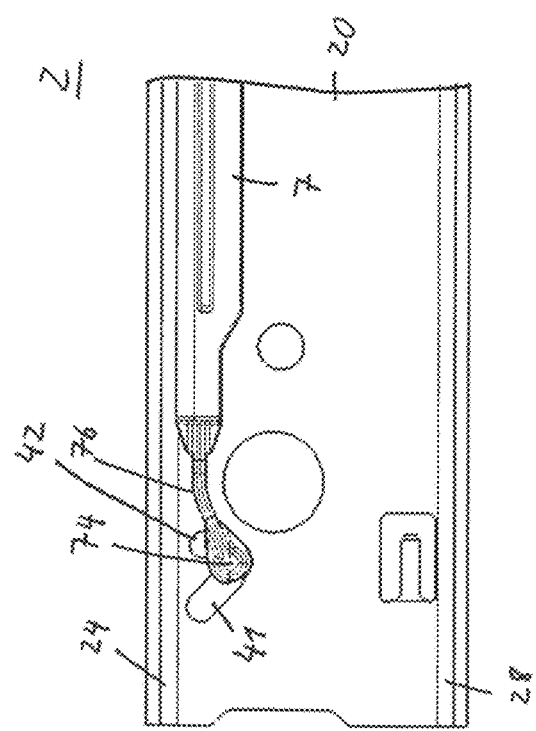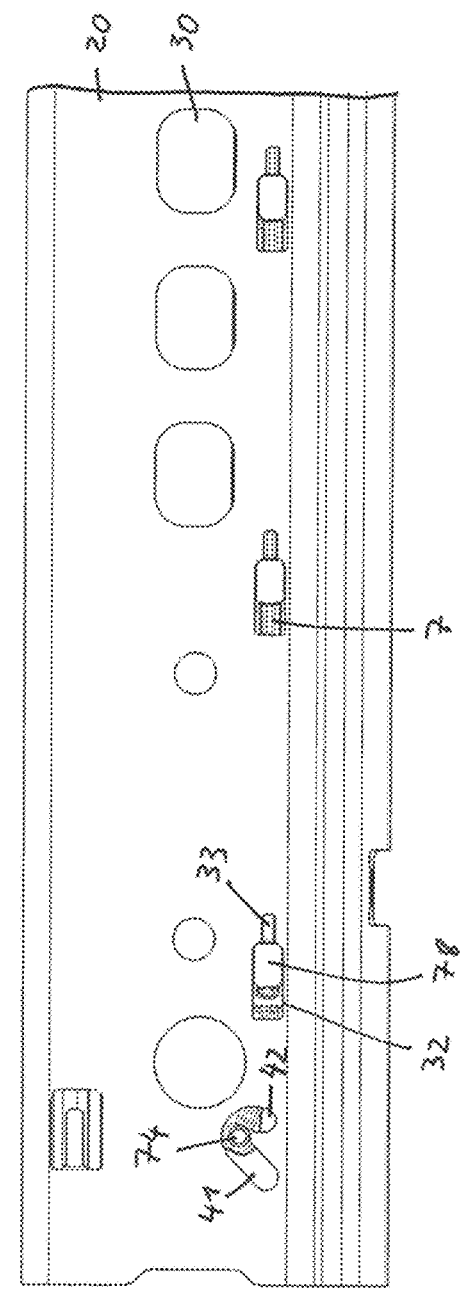

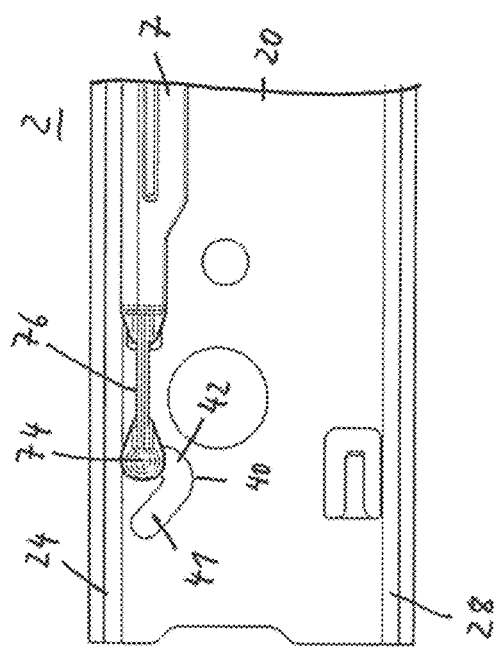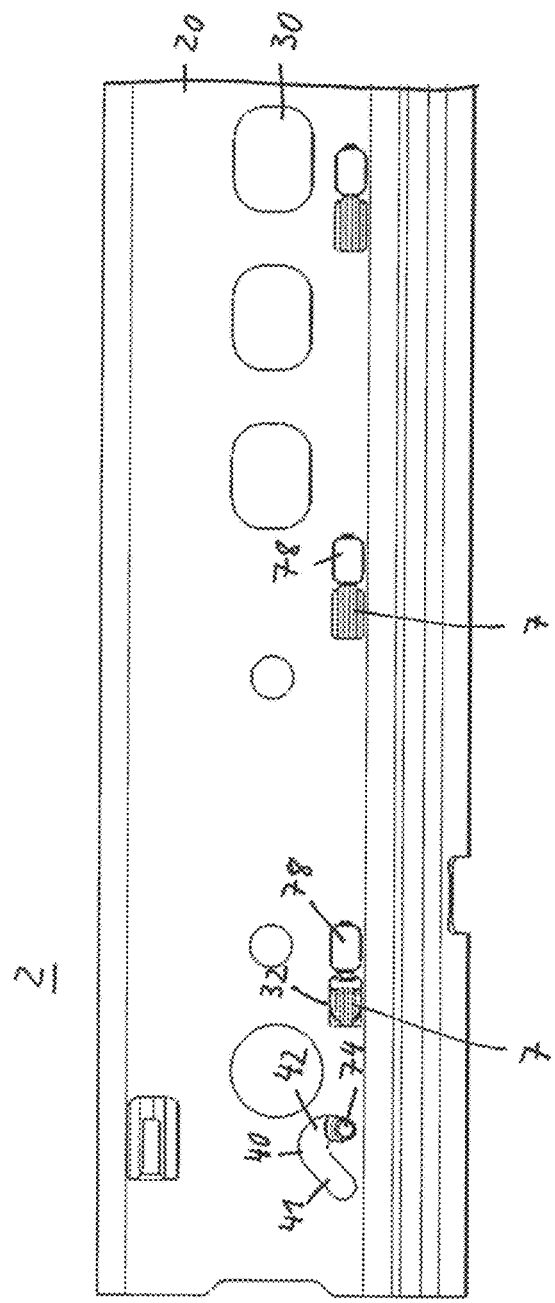

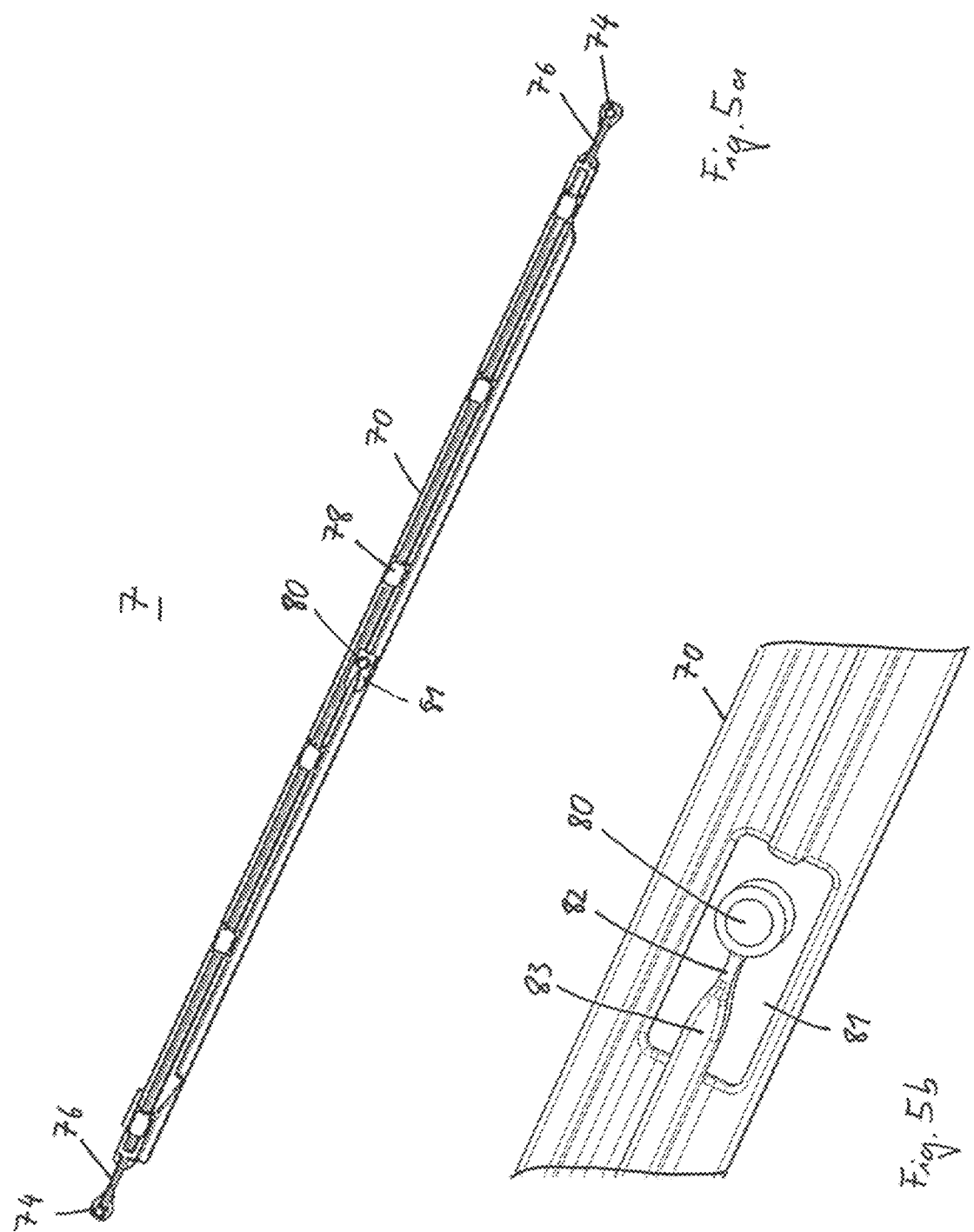

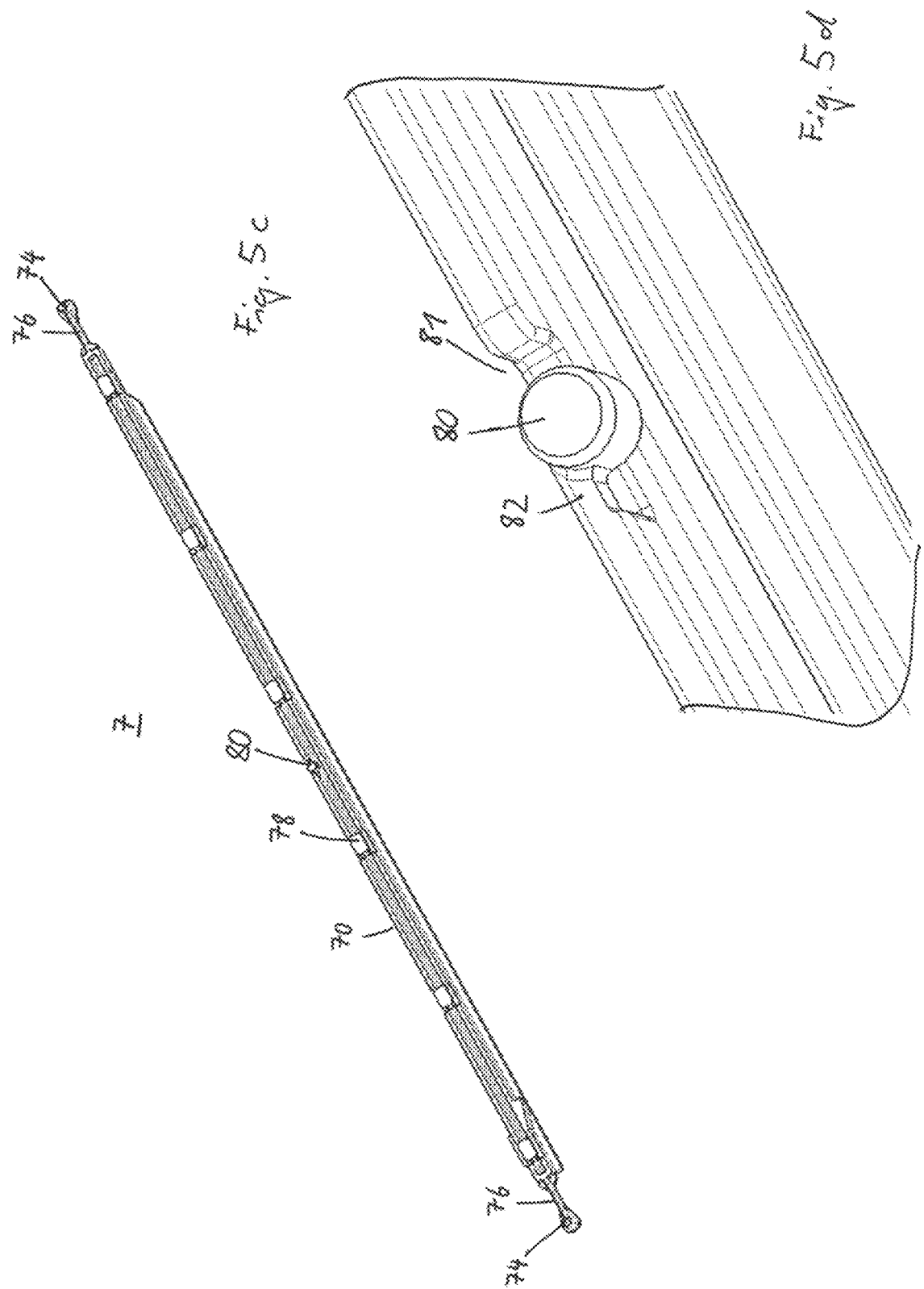

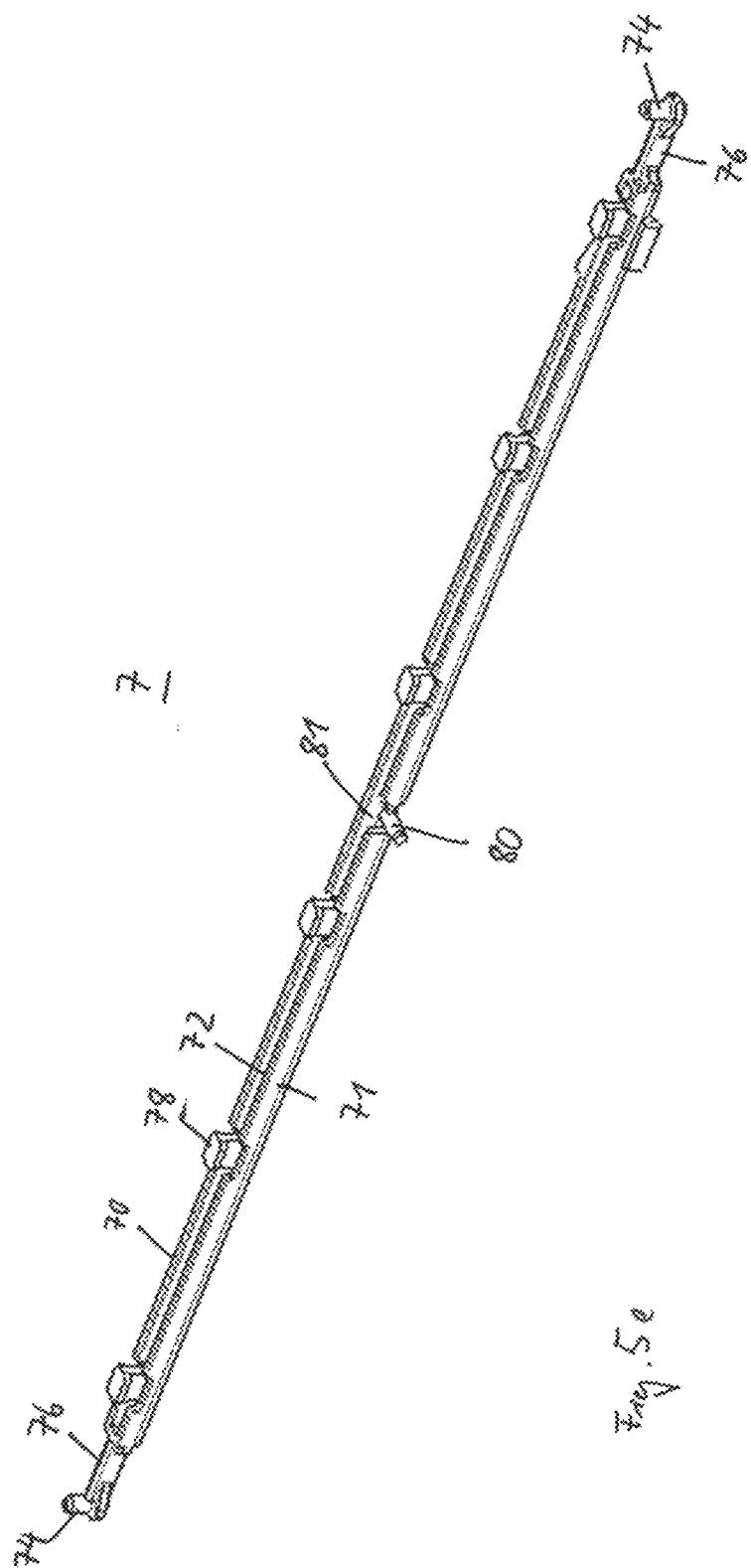

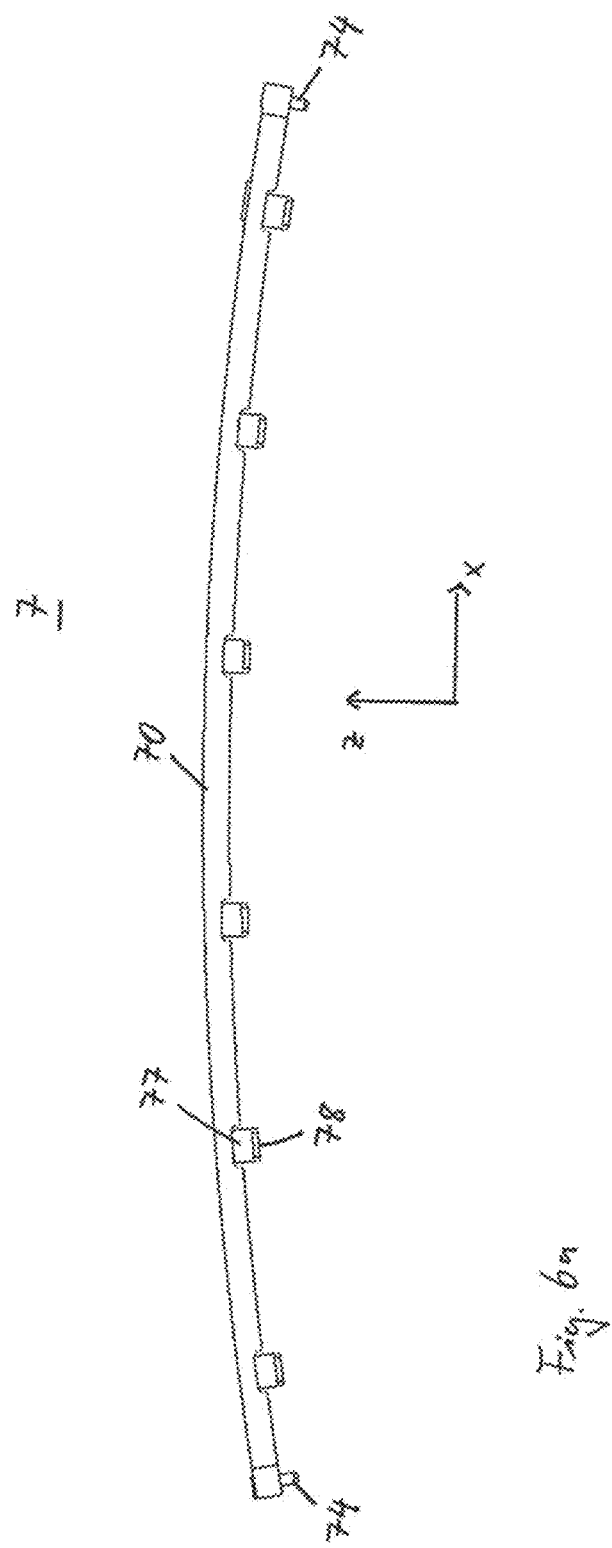

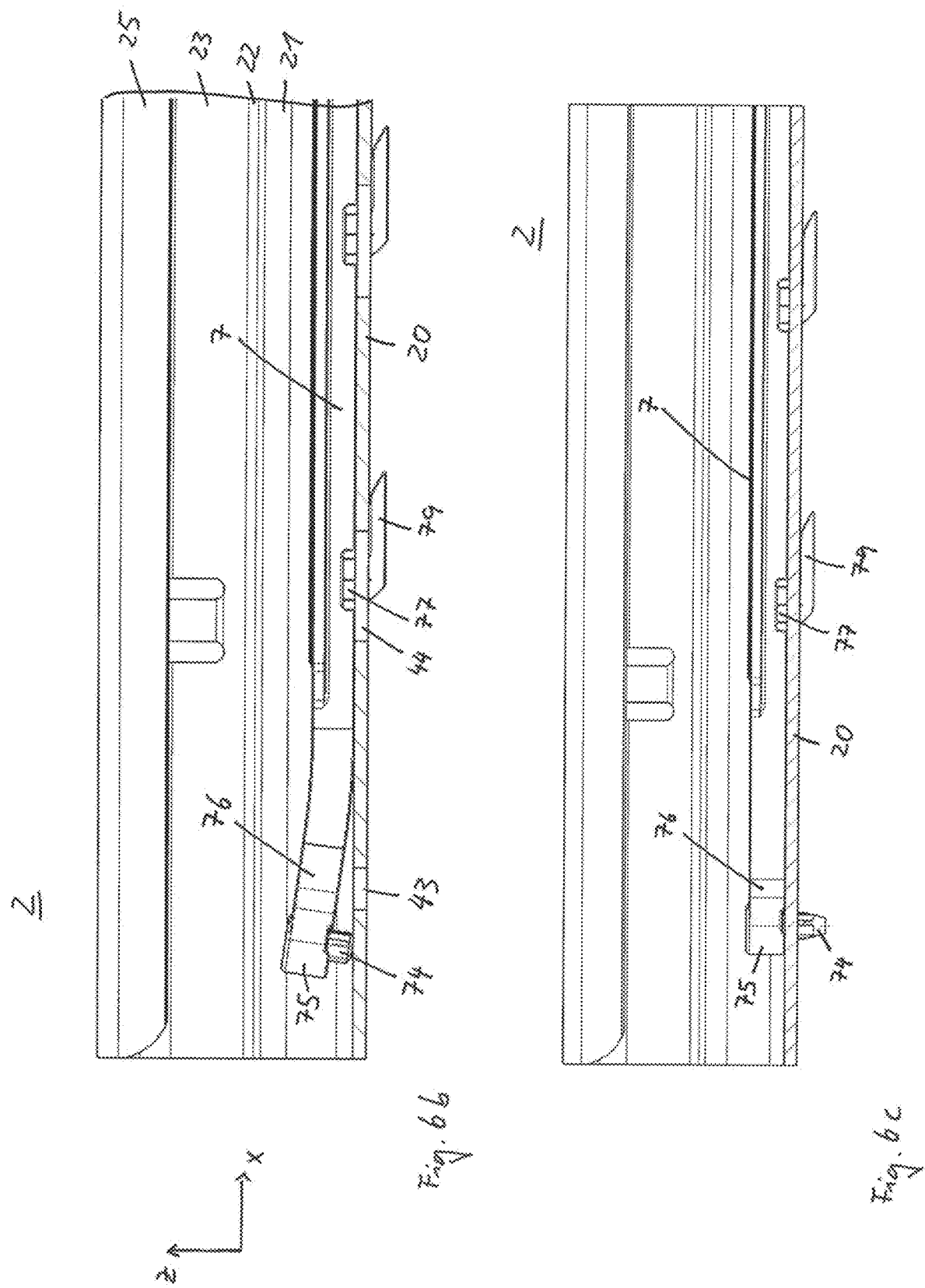

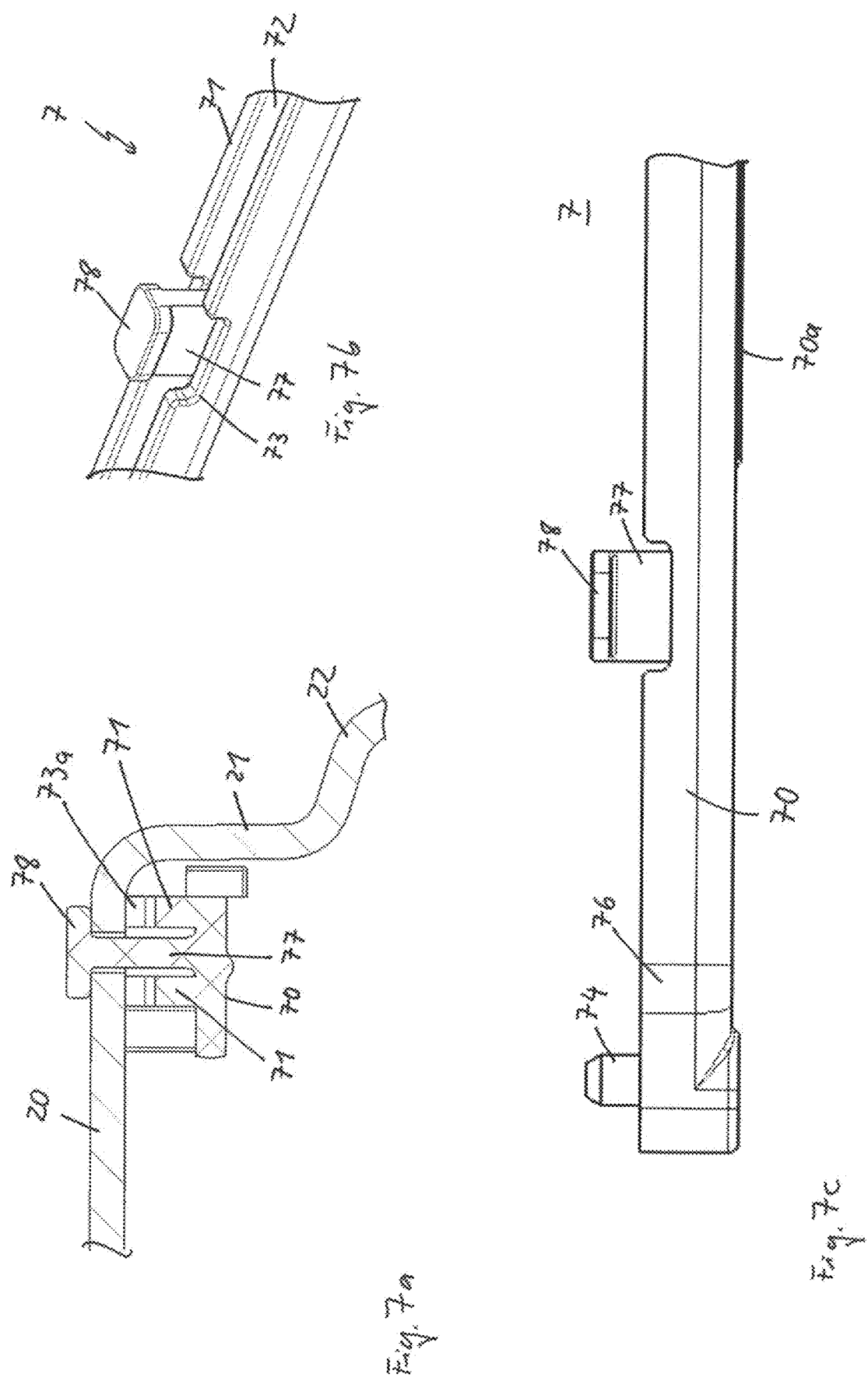

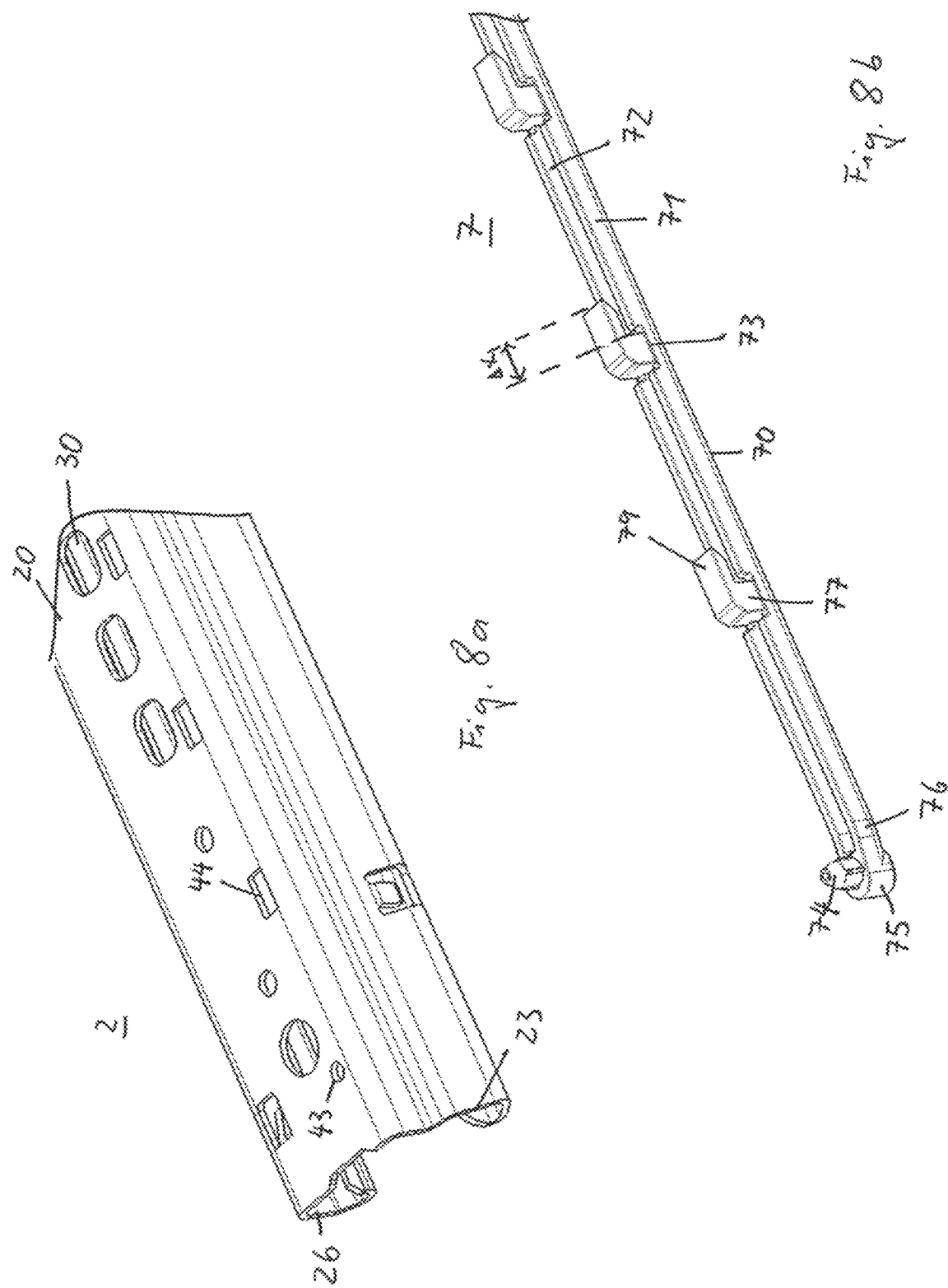

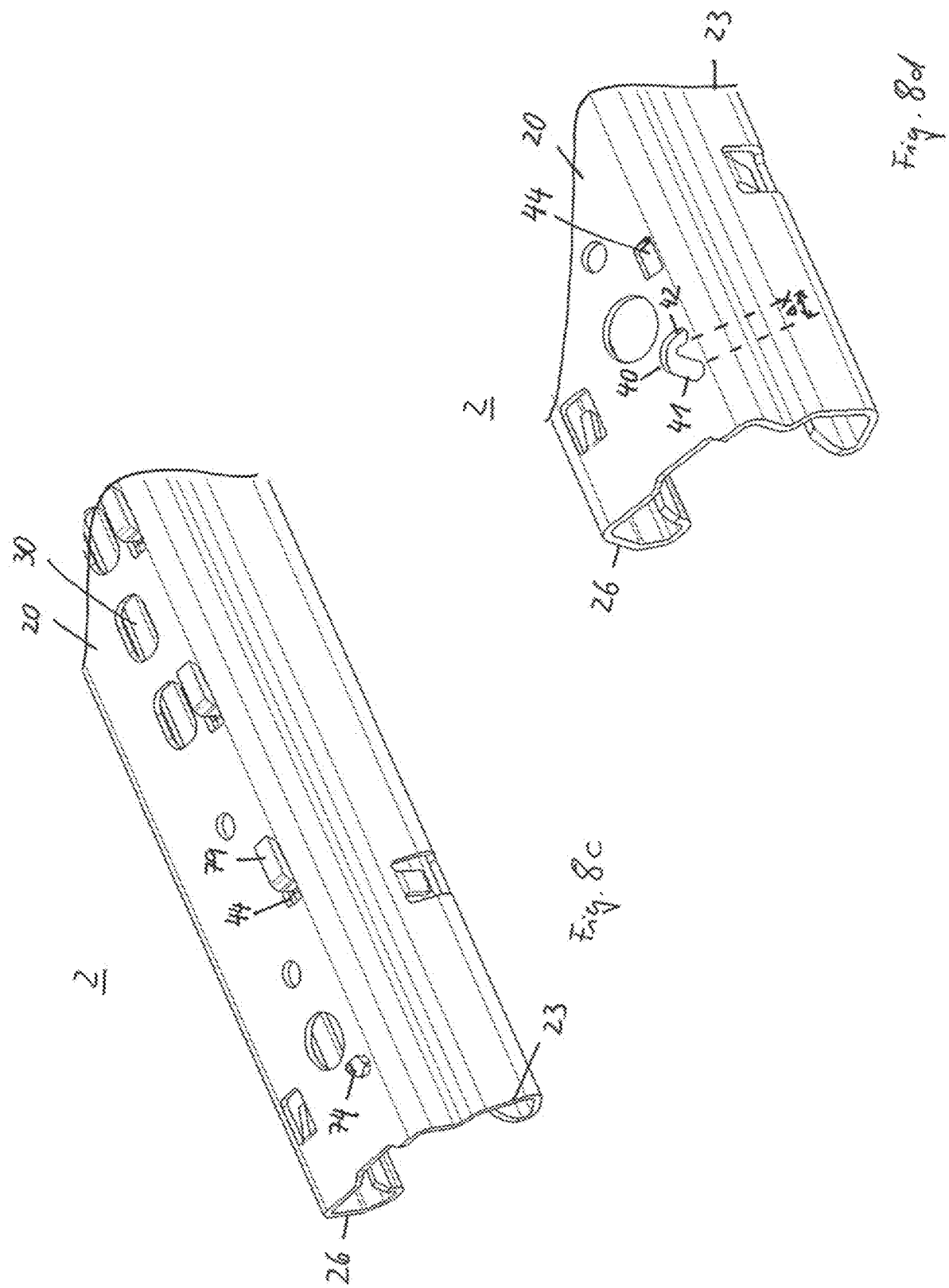

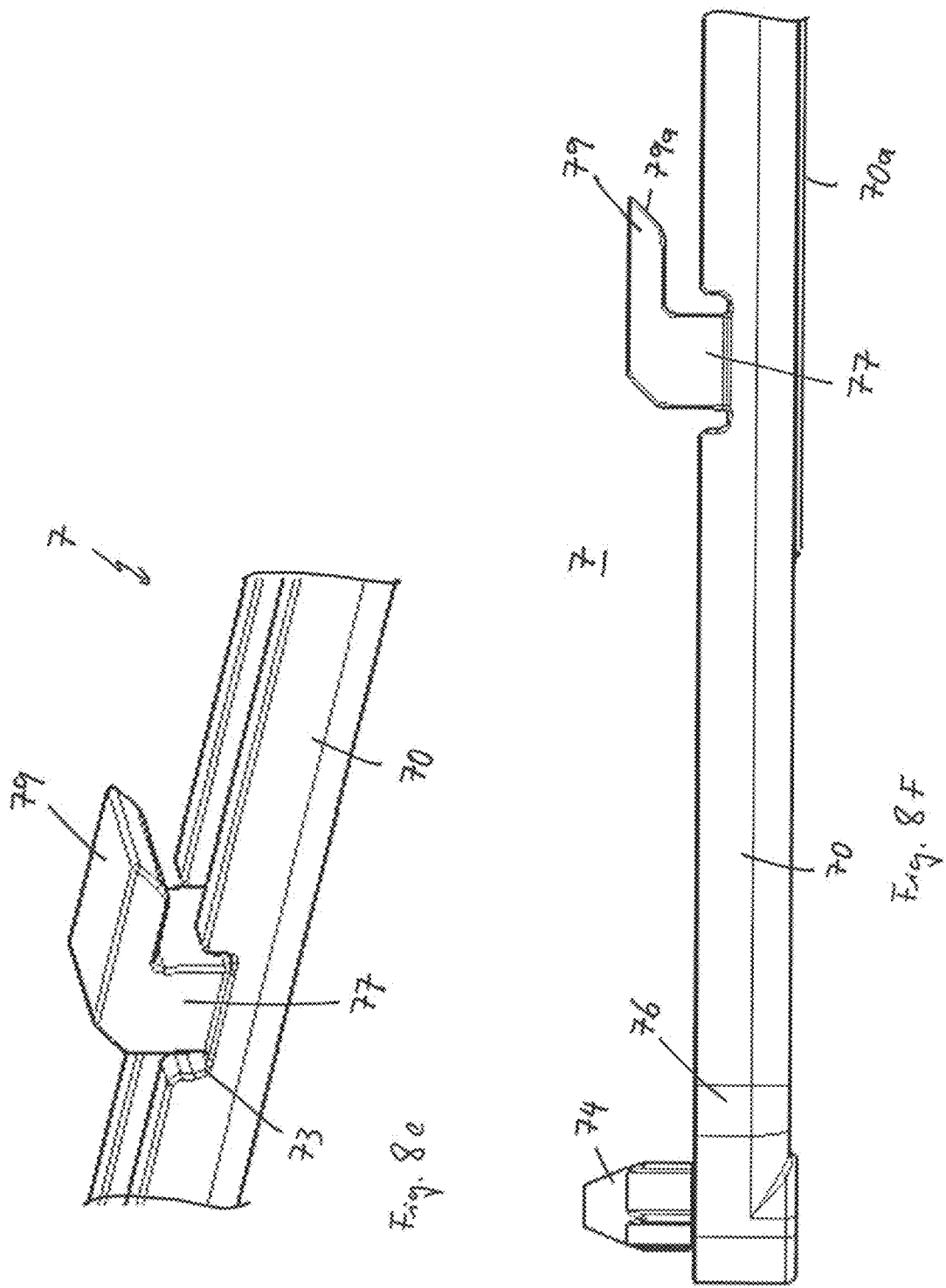

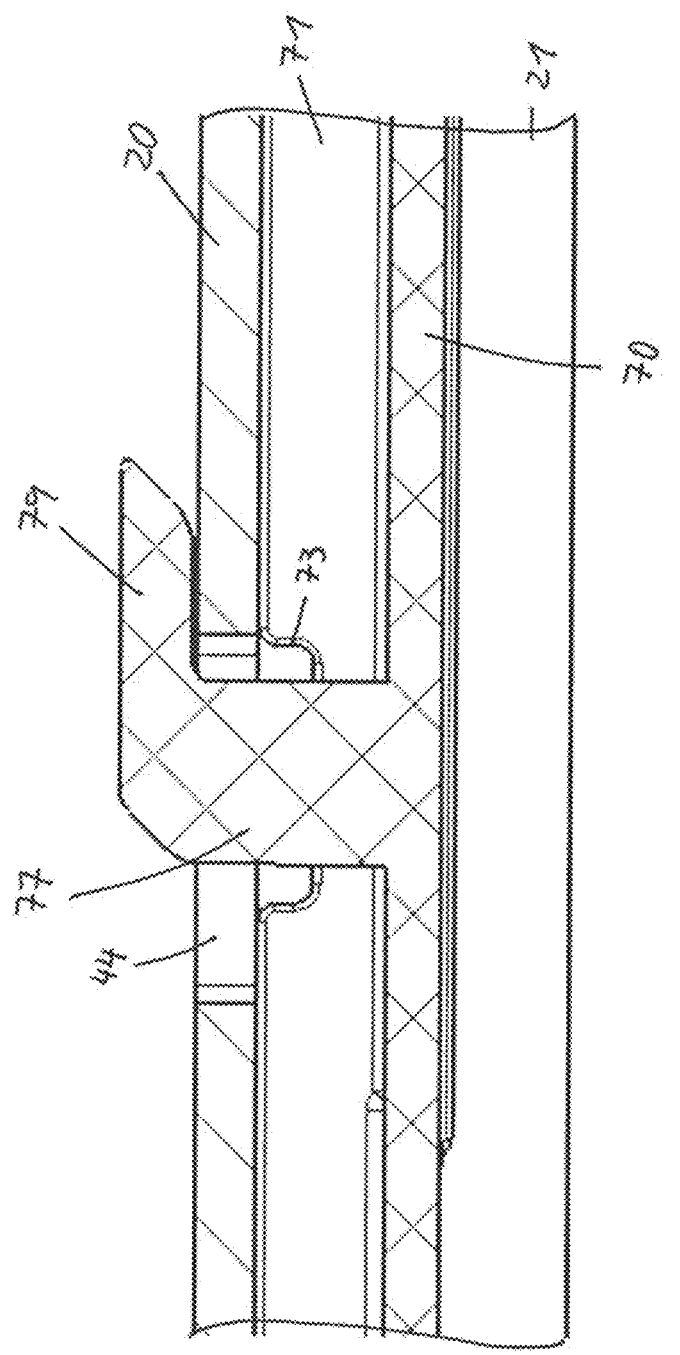

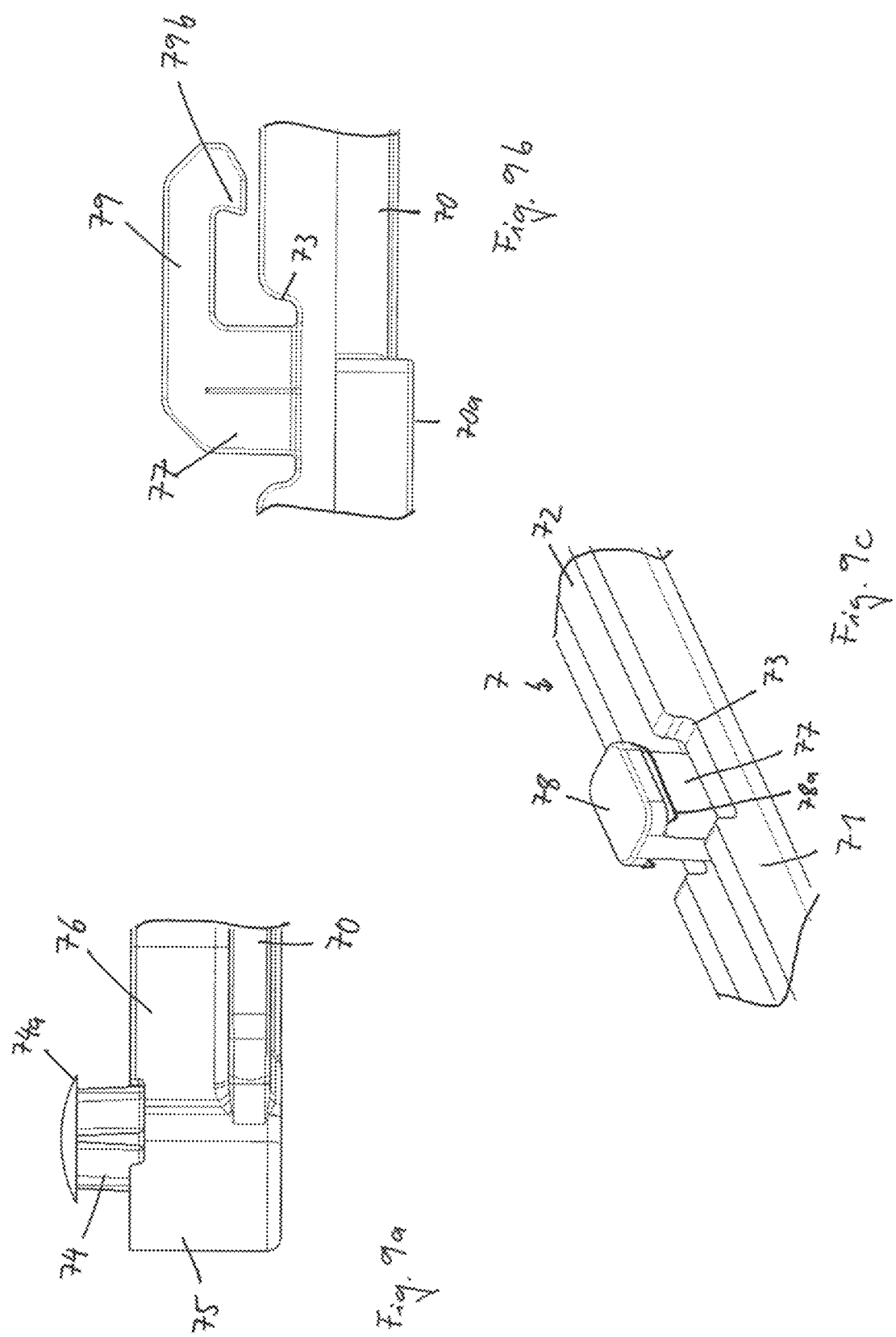

US 10,940,774 B2

ADJUSTING DEVICE FOR LONGITUDINAL ADJUSTMENT OF A VEHICLE SEAT, METHOD FOR ASSEMBLY THEREOF AND GUIDE PIECE

FIELD OF INVENTION

The present invention relates to an adjusting device for longitudinal adjustment of a vehicle seat, particularly of a motor vehicle seat, to a method for assembly of such an adjusting device and to a guide piece for such an adjusting device.

BACKGROUND

A conventional adjusting device for longitudinal adjustment of a vehicle seat comprises an upper rail, which supports the vehicle seat, and a lower rail, which is usually fixed to the bottom of the passenger compartment of a vehicle. The upper rail can be adjusted relative to the fixed lower rail in longitudinal direction for adjusting the longitudinal position of the vehicle seat as desired by the user. For fixing of the upper rail in a desired adjustment position with respect to the lower rail, a locking device for locking the upper rail to the lower rail is provided. The adjusting system further comprises a memory module fixed alternately with respect to the seat or to the vehicle, which has a movable blocking catch for forming a positive lock with the lower rail. A control lever mounted firmly to the seat is also provided for actuating the blocking catch. Finally, the adjusting system also includes an actuating means, mounted firmly to the seat, for unlocking the locking device.

The memory module is used for mechanically storing a set longitudinal seat positions if the position of the vehicle seat has to be temporarily adjusted in longitudinal direction. Such a temporary adjustment of the longitudinal position of a vehicle seat is necessary, for example in two-door passenger cars or in minibuses, in order to facilitate entry and egress for a passenger in the rear of the vehicle.

For storing the set longitudinal seat position, the seat-mounted control lever is coupled to an actuating mechanism for temporarily displacing the vehicle seat longitudinally, such as an entry or egress mechanism. If the vehicle seat is displaced longitudinally for entry or egress, the control lever is moved from its locking or latching position which it forms with the memory module, whereby the memory module is uncoupled from the vehicle seat. At the same time, the blocking catch of the memory module is actuated in order to form a positive lock with the lower rail. In other words, in the event of a temporary longitudinal displacement of the vehicle seat, the memory module is stopped in a fixed position on the lower rail. By means of the stopped position of the memory module on the lower rail, the preset longitudinal seat position is stored. According to German Utility Model DE 20 2004 011 388 U1, the mechanism for folding the backrest of the vehicle seat may be used as the actuating mechanism which triggers stopping of the memory module.

If the vehicle seat is pushed back again after stoppage of the memory module, the control lever, through suitable shaping, again forms a positive lock with the memory module at the stopped position and unlocks the positive lock between the blocking catch and the lower rail. The vehicle seat has again reached its original position.

US 2009/0134681 A1 of the Applicant discloses such a memory module in more detail. FIG. 2 of US 2009/0134681 A1 shows that the memory module is slidably mounted on a linear guide piece that is firmly mounted on inner surface of a base leg of the lower rail. The guide piece, on the one hand, reduces friction between the memory module and the lower rail and. On the other hand, it is needed to guide the memory module exactly in the longitudinal direction of the rail assembly. For this purpose, the linear guide piece is usually manufactured of a thermoplastic plastic material and firmly mounted on the inner surface of the lower rail.

Referring to FIGS. 1a-1d details of mounting a guide piece for a memory module to the lower rail of an adjusting device for longitudinal adjustment of a vehicle seat according to the prior art will be explained. FIG. 1b shows a conventional guide piece 210 having a generally linear main body 211 of rectangular profile, with a glide surface on the front end face, on which the memory module is supported. On the rear end face, a plurality of cylindrical posts 212 are provided, which protrude perpendicularly from the rear end face. At the front and rear end of the guide piece 210, locator pins of cylindrical shape are provided, which protrude perpendicularly from the rear end face from the guide piece 210. The main body 211 has a uniform stiffness over its entire length. As shown in FIG. 1a, corresponding holes 203, 204 are provided in the base leg 201 of the lower rail 200. More specifically, a plurality of locking recesses 202 are provided at regular intervals, each near the center of the base leg 201 if viewed in cross-section. For locking the longitudinal position of the upper rail (not shown) relative to the lower rail 200, locking devices, such as cylindrical locking pipes, engage with these locking recesses 202. At one side of these locking recesses 202 the holes 203, 204 are provided. The diameter of the holes 203 corresponds to the outer diameter of the posts 212, whereas the diameter of the holes 204 corresponds to the outer diameter of the locator pins 213.

For mounting the guide piece 210 on the inner surface of the base leg 201 of the lower rail 200, the guide piece 210 is lowered perpendicularly from above the base leg 201, until the locator pins 213 engage with the holes 204 and until the mounting posts 212 engage with the holes 203, as shown in FIG. 1c. As shown in FIG. 1c, in the pre-mounted state of FIG. 1c the posts 212 and locator pins 213 protrude through the holes 204, 203 of the lower rail 200. For fixedly mounting the guide piece 210 to the lower rail 200, the mounting posts 212 are then pressed into a mushroom-shape, to obtain a kind of rivet. The assembly consisting of the lower rail 200 and guide piece 210 is then placed into an ultrasonic welder, where the locator pins 213 are then melted, which results in a typical mushroom-shape of the front ends of the locator pins 213, as shown in FIG. 1d.

This process of mounting the guide piece to the guide rail is time consuming and requires expensive equipment. A large amount of electricity is required for ultra-sonic welding, suction of burned plastic gases is expensive and has an environmental impact. Nevertheless, the scrap rate of the mounting process is relatively high due to unreliable welding and pressing (riveting) results. Non-confirming welding spots are difficult to identify.

In the market, there exists the need for adjusting devices for longitudinal adjustment of a vehicle seat of the aforementioned kind, which can be assembled reliably and at as low costs as possible, which nevertheless are stable enough to offer sufficient reliability in daily use and security in extreme situations, particularly in the event of a crash.

SUMMARY OF INVENTION

Accordingly, it is an object of the present invention to provide an adjusting device for longitudinal adjustment of a vehicle seat including an oblong guide piece for guiding e.g. a memory module of an easy entry mechanism, that can be assembled reliably, at low costs and in an intuitive and easy manner. It is a further object of the present invention to provide an easy and reliable method for assembly of such an adjusting device at low costs, and a guide piece for use in such an adjusting device for longitudinal adjustment of a vehicle seat.

This problem is solved by an adjusting device for longitudinal adjustment of a vehicle seat as claimed in claim 1, by a method for assembly of such an adjusting device as claimed in claim 15 and by a guide piece as claimed in claim 21. Further advantageous embodiments are the subject-matter of the dependent claims.

According to the present invention there is provided an adjusting device for longitudinal adjustment of a vehicle seat, comprising: a first rail provided with a side-wall having an inner surface and an outer surface, defining a plurality of locking recesses and a positioning recess; a second rail, which is movably guided in a longitudinal direction relative to the first rail; and a guide piece mounted to the side-wall of the first rail; wherein the guide piece comprises: a main body extending in the longitudinal direction, a plurality of connecting devices provided on a side of the main body facing the inner surface of the side-wall of the first rail and connecting the guide piece to the first rail, and a positioning device configured to be locked in the positioning recess, for positioning the guide piece with respect to the first rail in the longitudinal direction; wherein the connecting devices are formed as hook-like members that are inserted through the locking recesses and grip behind the side-wall such that the guide piece is fixed to the first rail, the guide piece further comprises a flexible portion connected to the positioning device and the main body, and the flexible portion is configured to bend in a direction transverse to the longitudinal direction when mounting the guide piece to the side-wall and to be locked in the positioning recess such that the hook-like members grip behind the side-wall.

The guide piece comprises at least one positioning device, and may thus include also several positioning devices, such as two positioning devices disposed at the two opposite ends of the main body or two positioning devices, wherein a first positioning device is disposed at a first side of the main body facing the inner surface of the side-wall of the first rail and a second positioning device disposed at a side of the main body extending perpendicularly to this first side. Because each of the at least one positioning device is connected with the main body via the flexible portion, the guide piece can be mounted to the first rail simply by inserting the hook-like members into the locking recesses and displacing the guide piece in the longitudinal direction while bending each flexible portion in a direction transverse to the longitudinal direction (x), until the hook-like members grip behind the side-wall and each positioning device is locked in a positioning recess, for defining the position of the guide piece relative to the first rail in the longitudinal direction. The guide piece can therefore be mounted to the first rail in a simple, cost-efficient and intuitive manner.

Depending on the intended use the guide piece may be detachably fixed to the first rail, which requires a certain resiliency and mechanical stability, particularly stiffness, of the at least one flexible portion sufficient to reliably hold the guide piece in longitudinal position by permanently pushing the at least one positioning device into the positioning recess. For this purpose, the positioning device may be positively fit into the positioning recess, including a releasable clips-type fixing of the positioning device in the positioning recess. Detachably mounting the guide piece to the side-wall of the first rail enables demounting the guide piece later, e.g. for repair or maintenance purposes. According to an alternative embodiment, the guide piece may also be permanently fixed to the side-wall of the first rail, e.g. if there is no need for a later demounting of the guide piece. For this purpose, also a releasable clips-type fixing or similar fixing of the positioning device in the positioning recess may be used.

According to a further embodiment the locking recesses each comprise an insertion opening of a base area corresponding to a base area of the connecting devices, wherein the hook-like members grip behind the side-wall at locations offset relative to the insertion openings in the longitudinal direction by a predetermined distance. This eases the mounting, as a two-step procedure may be used, wherein the hook-like members may be inserted first into the insertion openings from vertically above the side-wall and the whole guide may then be displaced in longitudinal direction, until the at least one positioning device flexes back toward the side-wall to be locked in the corresponding positioning recess. Mounting of the guide piece can thus be achieved in an easy and intuitive manner that does not require special mounting tools.

According to a further embodiment the hook-like members each have a T-shaped cross-section, if viewed in the longitudinal direction, wherein each of the insertion openings is followed by a locking slot of a width less than a width of the base area of the insertion openings, and the hook-like members grip behind the side-wall at the locking slots.

According to a further embodiment the hook-like members each comprise a stem of a width corresponding to a width of the locking slots and a retention head of a width larger than a width of the locking slots, wherein a distance between the main body of the guide piece and each of the retention heads corresponds to a thickness of the side-wall.

According to a further embodiment the hook-like members each have a stem extending in a direction perpendicular to the main body and a retention head extending perpendicular to the stem and in parallel with the main body, wherein the retention head of each of the hook-like members grips behind the side-wall at a location offset relative to the insertion openings in the longitudinal direction by the predetermined distance.

According to a further embodiment a distance between the main body of the guide piece and each of the retention heads corresponds to a thickness of the side-wall, so that the guide piece will be automatically locked to the side-wall also in a direction perpendicular to the side-wall.

According to a further embodiment a hook-shaped locking member is formed at the end of each of the retention heads, which is received in a locking groove provided in the side-wall adjacent the respective insertion opening. This further assists in locking the guide piece relative to the side-wall in longitudinal direction.

According to a further embodiment the plurality of connecting devices and the at least one positioning device are aligned to each other in the longitudinal direction, wherein the at least one positioning recess comprises a locking groove extending in a direction transverse to the longitudinal direction, for locking the at least one positioning device in the at least one positioning recess and preventing a displacement of the guide piece in the longitudinal direction.

According to a further embodiment the at least one positioning recess further comprises an insertion groove extending under an acute angle relative to the locking groove in a direction away from the guide piece, wherein a vertex is formed at a region of intersection between the insertion groove and the locking groove.

According to a further embodiment the plurality of connecting devices and the at least one positioning device are aligned to each other in the longitudinal direction, wherein the at least one positioning recess comprises a locking groove extending in a direction transverse to the longitudinal direction, for locking the at least one positioning device in the at least one positioning recess and preventing a displacement of the guide piece in the longitudinal direction, wherein the at least one positioning recess further comprises an insertion groove extending under an acute angle relative to the groove in a direction away from the guide piece, a vertex being formed at a region of intersection between the insertion groove and the locking groove, and a distance between the insertion groove and the locking groove corresponds to the predetermined distance.

According to a further embodiment the guide piece further comprises at least one additional positioning device at a position between a front end of the guide piece and a rear end of the guide piece, extending in a direction perpendicular to each of the at least one positioning device, and connecting with the main body via an additional flexible portion, wherein at least one additional positioning recess is formed in a second side-wall adjacent the side-wall of the first rail, for receiving the at least one additional positioning device defining the position of the guide piece relative to the first rail in the longitudinal direction.

According to a further embodiment the at least one additional positioning recess comprises a locking groove extending in a direction transverse to the longitudinal direction and an insertion groove extending under an acute angle relative to the additional locking groove and toward the side-wall of the first rail, wherein a vertex is formed at a region of intersection between the insertion groove of the at least one additional positioning recess and the locking groove of the at least one additional positioning recess.

According to a further embodiment the guide piece is biased toward the inner surface of the side-wall of the first rail and is bow-shaped in a relaxed home position, if viewed in a side view, wherein the side of the main body facing the inner surface of the side-wall of the first rail and being provided with the plurality of connecting devices is a concave inner side of the bow-shaped guide piece in the relaxed home position.

According to a further embodiment the side of the main body facing the inner surface of the side-wall of the first rail and being provided with the plurality of connecting devices is a rear side of the guide piece and wherein a front side opposite to the rear side of the guide piece is provided with a glide surface directed to an inner volume of the adjusting device. This glide surface may be used for guiding a member, such as a memory module of an easy entry mechanism of the vehicle seat, in longitudinal direction and for reducing friction at an interface between these two members.

According to a further aspect of the present invention there is provided a method for assembly of an adjusting device for longitudinal adjustment of a vehicle seat, comprising: providing a first rail comprising a side-wall having an inner surface and an outer surface and comprising a plurality of locking recesses formed in the side-wall and at least one positioning recess; providing a second rail; providing a guide piece comprising a main body, a plurality of connecting devices provided on a side of the main body and at least one positioning device connected with the main body via a flexible portion; mounting the guide piece to the inner surface of the side-wall; and inserting the first rail into the second rail for finalizing the adjusting device for longitudinal adjustment of a vehicle seat. In the method the step of mounting the guide piece to the inner surface of the side-wall comprises: inserting the hook-like members into the locking recesses and displacing the guide piece relative to the first rail in the longitudinal direction while bending each flexible portion in a direction transverse to the longitudinal direction, until the hook-like members grip behind the side-wall and each of the at least one positioning device is locked in a positioning recess, for defining the position of the guide piece relative to the first rail in the longitudinal direction.

According to a further embodiment the step of providing the first rail comprises providing the locking recesses so that the locking recesses each comprise an insertion opening of a base area corresponding to a base area of the connecting devices. In the step of displacing the guide piece relative to the first rail in the longitudinal direction the guide piece is displaced relative to the first rail in the longitudinal direction by a predetermined distance so that the hook-like members grip behind the side-wall at locations offset relative to the insertion openings in the longitudinal direction by the predetermined distance.

According to a further embodiment the step of providing the first rail further comprises forming locking slots so that each of the insertion openings is followed by a locking slot of a width less than a width of the base area of the insertion openings; wherein the step of providing the guide piece further comprises forming the hook-like members so that the hook-like members each have a T-shaped cross-section, if viewed in the longitudinal direction, and each comprise a stem of a width corresponding to a width of the locking slots and a retention head of a width larger than a width of the locking slots; and in the step of displacing the guide piece relative to the first rail in the longitudinal direction the guide piece is displaced relative to the first rail in the longitudinal direction by the predetermined distance so that the retention head of each of the hook-like members grips behind the side-wall at the location of a locking slot.

According to a further embodiment the step of providing the guide piece further comprises forming the hook-like members so that the hook-like members each have a stem extending in a direction perpendicular to the main body and a retention head extending perpendicular to the stem and in parallel with the main body; wherein in the step of displacing the guide piece relative to the first rail in the longitudinal direction the guide piece is displaced relative to the first rail in the longitudinal direction by a predetermined distance so that the retention head of each of the hook-like members grips behind the side-wall at a location offset relative to the insertion openings in the longitudinal direction by the predetermined distance.

According to a further embodiment the step of providing the guide piece further comprises forming the plurality of connecting devices and the at least one positioning device so that the plurality of connecting devices and the at least one positioning device are aligned to each other in the longitudinal direction; wherein the step of providing the first rail further comprises forming the at least one positioning recess so that the at least one positioning recess comprises a locking groove extending in a direction transverse to the longitudinal direction; wherein in the step of mounting the guide piece to the inner surface of the side-wall each flexible portion is bent in a direction in parallel with a direction of the locking groove, and after displacing the guide piece relative to the first rail in the longitudinal direction by the predetermined distance each of the at least one positioning device slides into the locking groove, for defining the position of the guide piece relative to the first rail in the longitudinal direction.

According to a further embodiment the step of providing the first rail further comprises forming the at least one positioning recess so that the at least one positioning recess further comprises a locking groove extending in a direction transverse to the longitudinal direction and so that a distance between the insertion groove and the locking groove corresponds to the predetermined distance; wherein the step of mounting the guide piece to the inner surface of the side-wall further comprises inserting each of the at least one positioning device into an insertion groove; and in the step of displacing the guide piece relative to the first rail in the longitudinal direction each of the at least one positioning device slides in the insertion groove while bending each flexible portion in a direction transverse to the longitudinal direction until each of the at least one positioning device enters the locking groove.

According to a further aspect of the present invention there is provided a guide piece, for use in an adjusting device for longitudinal adjustment of a vehicle seat in a longitudinal direction, i.e. configured to be mounted to an inner surface of a side-wall of the adjusting device having a plurality of locking recesses and a positioning recess. This guide piece that is generally configured as outlined above and hereinafter, comprises: a main body extending in the longitudinal direction, a plurality of connecting devices provided on a side of the main body, for connecting the guide piece to the side-wall of the adjusting device, a positioning device configured to be locked in the positioning recess in the side-wall of the adjusting device, for positioning the guide piece with respect to the side-wall in the longitudinal direction, and a flexible portion connected to the positioning device and the main body; wherein the connecting devices are formed as hook-like members configured to grip behind the side-wall when inserted through the locking recesses, and the flexible portion is configured to bend in a direction transverse to the longitudinal direction and to return to a home position, so that the guide piece can be detachably fixed to the side-wall of the adjusting device.

OVERVIEW ON DRAWINGS

Hereinafter, the invention will be described with reference to preferred exemplary embodiments and with reference to the drawings, wherein:

FIGS. 1a-1d show the mounting of a guide piece for a memory module on the lower rail of an adjusting device for longitudinal adjustment of a vehicle seat according to the prior art;

FIG. 3a shows the lower rail of FIG. 2b in a perspective bottom partial view when the guide piece is not yet mounted;

FIGS. 3b-3c show details of a guide piece according to a first embodiment of the present invention;

FIG. 3d shows details of a mounting recess in the lower rail of FIG. 3a according to a first embodiment of the present invention;

FIG. 3e shows the lower rail of FIG. 3a in a perspective bottom partial view when the guide piece is mounted, with a mounting recess according to FIG. 3d;

FIG. 3f shows details of the mounting of the guide piece according to the first embodiment to the lower rail of FIG. 3a;

FIGS. 4a-4b show in a partial top view and in a partial bottom view a first stage of a process for mounting the guide piece according to the first embodiment to the lower rail of FIG. 3a;

FIGS. 4c-4d show in a partial top view and in a partial bottom view a second stage of a process for mounting the guide piece according to the first embodiment to the lower rail of FIG. 3a;

FIGS. 4e-4f show in a partial top view and in a partial bottom view a final stage of a process for mounting the guide piece according to the first embodiment to the lower rail of FIG. 3a;

FIGS. 5a-5b show details of a first modification to the guide piece according to the first embodiment of the present invention;

FIGS. 5c-5d show details of a second modification to the guide piece according to the first embodiment of the present invention;

FIGS. 5e-5f show details of a third modification to the guide piece according to the first embodiment of the present invention;

FIG. 6a shows a guide piece according to a second embodiment of the present invention in a side view;

FIG. 6b-6c show two different stages of mounting the guide piece according to FIG. 6a to a lower rail according to a further embodiment of the present invention;

FIG. 7a-7b show details of the guide piece of FIG. 3b in a cross-sectional view and in a mounted state;

FIG. 7c show further details of the guide piece of FIG. 3b;

FIG. 8a shows a partial perspective bottom view of a lower rail according to a further embodiment of the present invention;

FIG. 8b is a partial perspective view of a guide piece according to a second embodiment for mounting to the lower rail of FIG. 8a;

FIG. 8c shows the mounting of the guide piece according to FIG. 8b to the lower rail of FIG. 8a;

FIG. 8d shows details of a further modification to the lower rail of FIG. 8a;

FIGS. 8e-8f show further details of the guide piece according to the second embodiment of the present invention;

FIG. 8g shows in a cross-sectional view details of mounting the guide piece according to the second embodiment of the present invention to the lower rail of FIG. 8a; and FIGS. 9a-9c show further variants to a guide piece according to the present invention.

Throughout the drawings, like reference numerals designate identical or technically equivalent elements or groups of elements.

DETAILED DESCRIPTION OF PREFERRED EMBODIMENTS

Before describing details of an adjusting device for longitudinal adjustment of a vehicle seat according to the present invention and of a method for assembly of such an adjusting device, the general geometry of such an adjusting device will be described with reference to FIG. 2a, which shows such an adjusting device in a cross-section. The adjusting device 3 for longitudinal adjustment of a vehicle seat generally consists of an upper rail 1 (also referred to as a first rail in the appended claims) and of a lower rail 2 (also referred to as a second rail in the claims). The upper rail 1 is movably guided in a longitudinal direction (x, perpendicular to the vertical direction z and the transverse direction y indicated in FIG. 2a) relative to the lower rail 2.

Figure 2A:
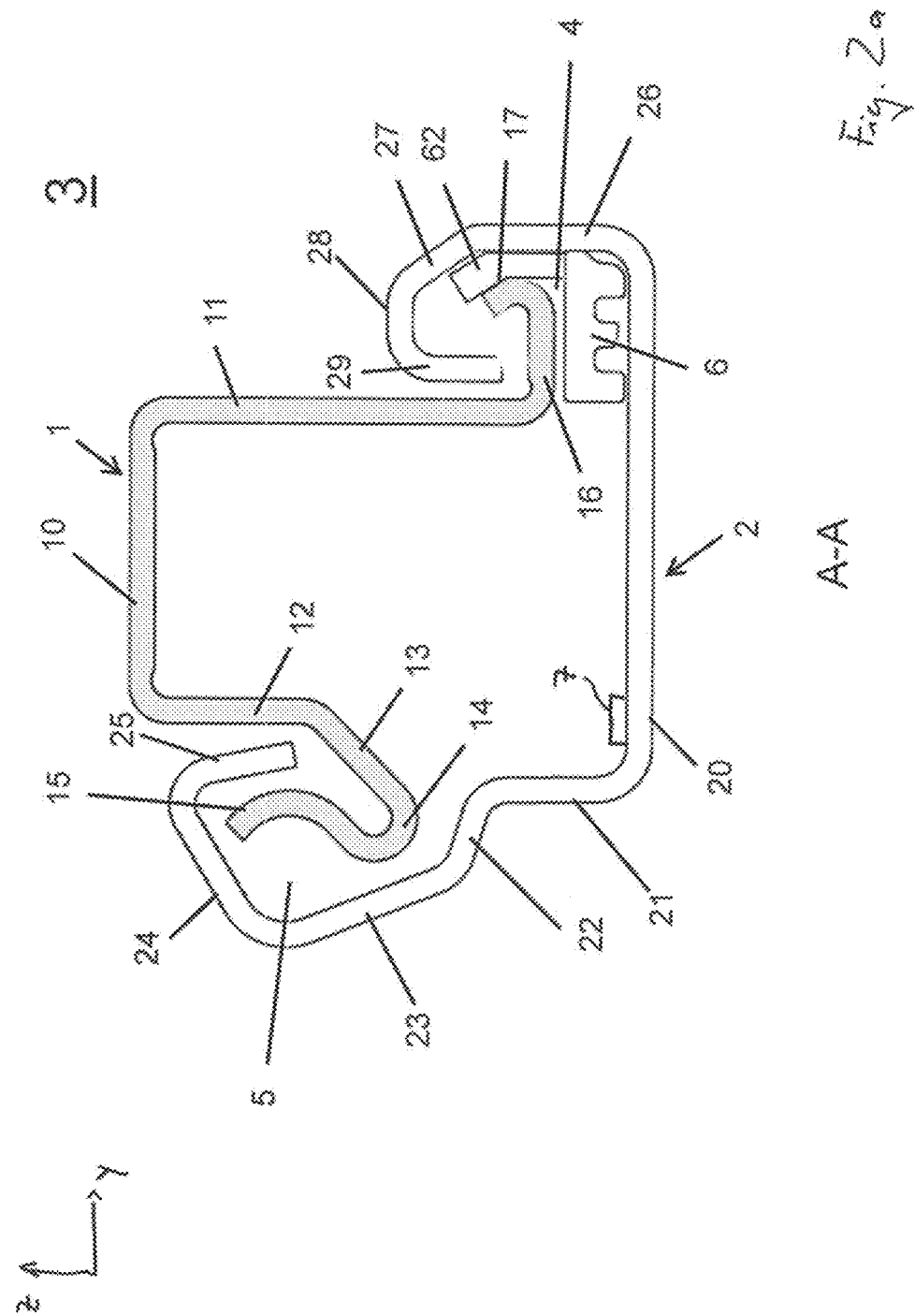
FIG. 2a is a cross-section showing the general geometry of an adjusting device for longitudinal adjustment of a vehicle seat.

As shown in FIG. 2a, the upper rail 1 is substantially inverse U-shaped and comprises a base leg 10 (bottom) and an L-leg 11 projecting substantially perpendicularly from the base leg 10. The L-leg 11 is adjoined with a horizontal third connecting leg 16, which is followed by a bearing leg 17, which represents a second end portion of the upper rail 1 and extends under an acute angle upward and toward the interior of the upper rail 1. On the opposite side, a first connecting leg 12 extends substantially perpendicularly to the base leg 10 and in parallel with the opposite L-leg 11. The first connecting leg 12 is followed by a second connecting leg 13, which extends under an acute angle downward and toward the outer side of the upper rail. The second connecting leg 13 is followed by a bending portion 14 and a first end portion 15, which is semi-circularly curved in correspondence with the radius of curvature of steel balls (not shown) to be supported.

As shown in FIG. 2a, the lower rail 2 is substantially U-shaped and comprises a base leg 20 (bottom, also named as the "side-wall" in the appended claims) and an L-leg 21 projecting substantially perpendicularly and upward from the base leg 20. The L-leg 21 is adjoined with a slanted first connecting leg 22, which extends outwards from lower rail 2, preferably inclined upward, which is followed by a second connecting leg 23, which extends under an acute angle outwards and upwards relative to base leg 20, and a third connecting leg 24, which extends under an acute angle inwards and upwards relative to base leg 20, and is finally followed by the first end portion 25, which extends downward, toward based leg 20 and into the gap between the first connecting leg 12 of upper rail 1 and the opposite first end portion of upper rail 1. Steel balls (not shown) serving as bearing members are supported by the semi-circular curved end portion 15 of upper rail 1 and the opposite corner region between second connecting leg 23 and third connecting leg 24 of lower rail 2.

On the opposite side, a fourth connecting leg 26 extends substantially perpendicularly to the base leg 20 and in parallel with the opposite L-leg 21. The fourth connecting leg 26 is followed by a fifth connecting leg 27, which extends under an acute angle upward and toward the inner side of the lower rail 2. The fifth connecting leg 27 is followed by a sixth connecting leg 28, which extends in parallel with horizontal base leg 20 and inward, and by the second end portion 29, which extends downward toward base leg 20 and into the gap between the bearing leg 17 and L-leg 11 of upper rail 1.

Thus, the end portions 25, 29 of the lower rail 2 embrace the corresponding end portions 15, 17 of the upper rail 1. The bearing areas formed by end portions 15, 25 and 17, 27, respectively, are thus diagonally offset to each other and biased against each other.

Further details of the geometric configuration of the adjusting device 3 for longitudinal adjustment of a vehicle seat are disclosed in US 2013/0075571 A1 of the Applicant, the whole content of which is hereby incorporated by reference. It is noted, however, that the adjusting device 3 shown in FIG. 2a merely shall serve as an example and that the principles of mounting a guide piece 7 to a side-wall of the lower rail 2 according to the present invention, as disclosed in the present application, may be adopted for an adjusting device for longitudinal adjustment of a vehicle seat of any other geometric configuration, as known to the skilled person.

Figure 2B:
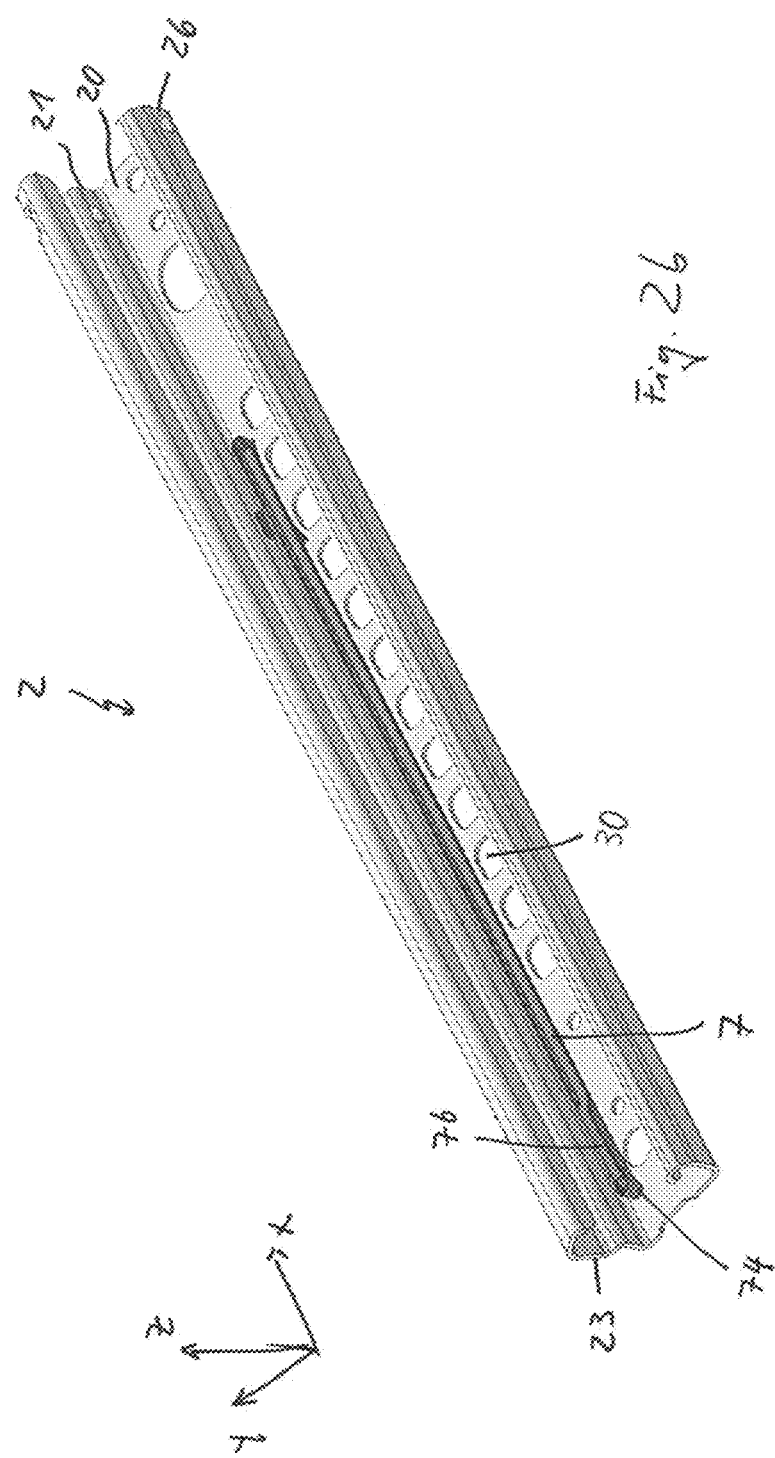
FIG. 2b shows the mounting of a guide piece for a memory module on the lower rail of an adjusting device for longitudinal adjustment of a vehicle seat according to the present invention.

As shown in FIGS. 2a and 2b, a linear guide piece 7 is mounted in the inner surface of base leg 20 (also referred to as the "side-wall" in the appended claims) so as to extend in the longitudinal direction x of the lower rail 2. Hereinafter, the direction y will be referred to also as a transverse direction, transverse to the longitudinal direction x of the vehicle, and the direction z will be referred to also as a vertical direction of the vehicle, perpendicular to both the longitudinal direction x and the transverse direction y. In the embodiments shown in the appended drawings, the guide piece 7 serves for guiding a memory module of an easy entry mechanism of the kind disclosed e.g. in US 2009/0134681 A1 of the Applicant, the whole content of which is hereby incorporated by reference, so that further details of such a memory module and of such an easy entry mechanism may be omitted. As will become apparent to the skilled person, the present application is, however, not delimited to this particular use. Rather, the linear guide piece 7 may also be used for different purposes.

As shown in FIG. 2b, a plurality of locking recesses 30 are formed in a central region of the base leg 20 of the lower rail, which serve for locking pipes of a locking device (not shown), which are biased toward the base leg 20, for locking the position of the upper rail and of the vehicle seat in the longitudinal direction x by positive engagement with the locking recesses 30 and which can be displaced in vertical direction z to be released from engagement with the locking recesses 30, for adjusting the longitudinal position of the upper rail and of the vehicle seat relative to the lower rail 2. The guide piece 7 is mounted at one side of the row of locking recesses 30, near the vertical L-leg 21 of the lower rail 2, without obstructing a free access for the locking pipes to the locking recesses 30 from vertically above. Of course, the guide piece may also be mounted instead to a vertical side-wall of the lower rail 2, such as the upright vertical side-wall 26 shown in FIG. 2b.

The guide piece 7 is shown in more detail in FIG. 3b and comprises a linear main body 70 extending in the longitudinal direction x. On the bottom surface of the main body 70 a glide surface is provided, on which a memory module of an easy entry module may be supported and guided. The main body 70 is generally U-shaped in cross-section, and comprises two upright side-walls 71 spaced apart from each other and extending in parallel to each other. A linear channel 72 is formed between the two side-walls 71. At the front and rear end of the main body 70 the side-walls 71 merge into a flexible connecting portion of e.g. rectangular cross-section extending in the longitudinal direction x. At the free end of each connecting portion 76 a collar 76 is formed. A positioning pin 74 protrudes perpendicularly from each collar 75 and is used for defining the position of the guide piece 7 relative to the first rail in the longitudinal direction x by engagement into a locking recess 40 formed in the base leg 20 of the lower rail 2 (cf. FIG. 3a). The flexible connecting portion 76 can be bent in a direction transverse to the longitudinal direction x, i.e. in z- and/or y-direction. For this purpose, the guide piece 7 is preferably made of a plastic material, e.g. by plastic injection molding. The stiffness and resiliency of the main body 70 is preferably uniform and constant over its entire length between the two flexible connecting portions 76, whereas the flexible connecting portions 76 are more flexible and resilient than the main body 70.

As shown in FIG. 3b, the guide piece 7 further comprises a plurality of T-shaped retention heads 78 formed at the front ends of stems 77 of rectangular profile protruding from a bottom of the channel 72 in the vertical direction z. The T-shaped retention heads 78 are provided on a side of the main body 70 facing the inner surface of the base leg of the lower rail and serve as connecting devices for connecting the guide piece 7 with the lower rail. The retention heads 78 are formed at positions corresponding to the locations of mounting recesses 31 formed in the base leg 20 of lower rail 2 (cf. FIG. 3a). Preferably, the retention heads 78 and the mounting recesses 30 are formed at equidistant spacings. For providing a sufficient mechanical stability, the stems 77 each have an adequate length in the longitudinal direction x. For enabling a visual inspection of the retention heads 78, e.g. for quality control purposes after injection molding, and for assisting in mounting/demounting the guide piece 7 to/from the lower rail, e.g. for replacement or repair, a plurality of rectangular windows or recesses 73 are provided in the side-walls 71 at the positions of the stems 77. Thus, a specifically designed mounting tool (not shown) may grip the guide piece 7 in the recesses 73, to drive a displacement of the guide piece in the x-direction.

As shown in FIG. 3d, each of the mounting recesses 31 comprises an insertion opening 32 and a locking slot 33 of a length Δx in x-direction (hereinafter also referred to as the "predetermined distance"). As shown in FIG. 3f, the shape and base area of the insertion opening 32 corresponds to the shape and base area of the retention head 78. In the example shown in the drawings, the retention head 78 has a rectangular shape. However, the present invention is not delimited to this particular shape, and the retention heads 78 may have any other hook-like shape suited to lock the guide piece 7 in vertical direction at the lower rail. As shown in FIG. 3f, the width of the locking slot 33 in y-direction corresponds to the width of the stem 77 in y-direction. As shown in FIG. 3f, the length of the retention head 78 in x-direction may correspond to the length of the stem 77 and locking slot 33, so that the stem 77 may be fully accommodated in the locking slot 33.

FIG. 3f shows the retention head 78 in the locked position of the guide piece, where each of the T-shaped retention heads 78 (serving as hook-like members) grips behind the base leg 20 of the lower rail in the region of the locking recess 33. For firmly locking the guide piece 7 in z-direction to the lower rail without clearance, the distance between the main body 70 of the guide piece 7 and each of the T-shaped retention heads 78 preferably corresponds to a thickness of the base leg of the lower rail.

As shown in FIG. 3e, the locking recess 40 is formed as a hook-shaped guiding slot in the base leg 20 of the lower rail 2, comprising a locking groove 42 extending in y-direction, transverse to the longitudinal direction x. When the guide piece is mounted to the lower rail 2, as shown in FIG. 3e, the locking groove 42 serves for locking the positioning pin 74 relative to the lower rail 2 in the longitudinal direction x and for preventing a displacement of the guide piece in the longitudinal direction x. As shown in FIG. 3e, the locking groove 42 further comprises an insertion groove 41 extending under an acute angle relative to the locking groove 42 in a direction away from the guide piece and toward an end of the lower rail 2, e.g. the front end of the lower rail 2. As shown in FIG. 3e, the insertion groove 41 communicates with the locking groove 42, a vertex being formed at a region of intersection between the insertion groove 41 and the locking groove 42. As shown in FIG. 3e, the distance between the front end of the insertion groove 41 and the locking groove 42 in x-direction corresponds to the predetermined distance Δx, which corresponds to the length of the locking slot 33 in x-direction.

When the guide piece is mounted to the lower rail 2, as shown in FIG. 3e, the positioning pin 74 is received at the front end of locking groove 42 and is aligned with all stems 77 of the retention heads 78 of the guide piece, which provides a certain stiffness of the guide piece in the transverse y-direction, to prevent an inadvertent displacement of the positioning pin 74 in y-direction and thus an inadvertent separation of the guide piece from the lower rail 2 in use.

With reference to FIGS. 4a to 4f, details of a process for mounting a guide piece 7 according to a first embodiment of the present invention to the lower rail of FIG. 3a will be described. Here, FIGS. 4a, 4c and 4e show the front end of the lower rail 2 in a partial top view, whereas FIGS. 4b, 4d and 4f show the front end of the lower rail 2 in a partial bottom view. The process of mounting the guide piece 7 starts with lowering the guide piece 7 onto the base leg 20 from vertically above the lower rail 2 until the positioning pin 74 slides into the insertion groove 41, as shown in FIG. 4a and until the retention heads 78 slide into the insertion openings 32, as shown in FIG. 4b. At this stage, the positioning pin 74 is aligned with all stems of the retention heads 78, as shown in FIG. 4b. At this stage the flexible connecting portion 76 of the guide piece 7 is not bent perpendicular to the x-direction, as the positions of the front end the insertion groove 41 and of the insertion openings 78 is perfectly matched to the positions of the positioning pin 74 and of the retention heads 78.

As a next step, the guide piece 7 is displaced slightly in the longitudinal direction (x). FIGS. 4c and 4d show the guide piece 7 at an intermediate position, halfway between the insertion position of FIGS. 4a and 4b and the fully mounted position shown in FIGS. 4e and 4f. Thus, for reaching the state of FIGS. 4c and 4d, the guide piece 7 is displaced in x-direction about half the predetermined distance Δx, where the positioning pin 74 has reached the region of the vertex between the insertion groove 41 and the locking groove 42. As the guide piece 7 is displaced in x-direction, the positioning pin 74 slides in the insertion groove 41 and all stems of the retention heads 78 enter the locking recesses 33 to be guided therein, the flexible connecting portion 76 is bent in y-direction, i.e. transverse to the longitudinal direction x.

When the guide piece 7 is displaced further in x-direction, finally the fully mounted condition of the guide piece 7 will be reached, as shown in FIGS. 4e and 4f, where the flexible connecting portion 76 has returned to the (unbiased) relaxed home position and the positioning pin 74 is received at the front end of locking groove 42, namely again in alignment with all stems of the retention heads 78 in x-direction. In order to ensure that the flexible connecting portion 76 is completely relaxed (unbiased) in the fully mounted condition of the guide piece 7, the distance between the front end of the insertion groove 41 and the locking groove 42 corresponds to the predetermined distance Δx in x-direction. Furthermore, the length of the locking recesses 33 in x-direction needs to be identical to or larger than the predetermined distance Δx. In this fully mounted condition, the guide piece 7 is locked to the lower rail 2 by positive fit, wherein the position of the guide piece 7 relative to the first rail 2 in the longitudinal direction x is fixed by the engagement of the at least one positioning pin 74 in the associated locking groove 42. As this locking groove 42 extends transverse to the x-direction, the longitudinal position of the guide piece 7 relative to the lower rail 2 can be fixed without clearance.

If the positioning pin 74 is cylindrical, as shown in FIG. 3b, it will not be locked in z-direction in the locking groove 42. Rather, the positioning pin 74 is only locked in y-direction, transverse to the longitudinal direction, due to the resilient biasing force exerted by the flexible connecting portion 76. Furthermore, the positioning pin 74 is locked in x-direction by the locking groove 42. Thus, the positioning pin 74 is reversibly received in the locking groove 42, so that the guide piece 7 may also be separated again from the lower rail, e.g. for replacement or repairing purposes, by performing the above steps in reverse order.

Of course, according to further embodiments according to the present invention, the positioning pins 74 may also be locked in z-direction in the locking grooves 42, e.g. be snap-fitted into the locking grooves 42 or locking holes provided in the base leg of the lower rail.

Instead of providing a positioning pin at the front and/or rear end of the guide piece, or as an additional positioning and locking measure, one additional positioning pin (or a plurality of additional positioning pins) may also be disposed at other portions of the guide piece. As an example for such an embodiment, FIGS. 5a and 5b show details of a first modification to the guide piece 7 according to the first embodiment of the present invention. As shown in FIG. 5b, an additional positioning pin 80 is disposed in a window 81 of the main body 70 and connected via a flexible connecting portion 82 and a web 83 to the main body, to enable a bending of the flexible connecting portion 82 in y- and/or z-direction when mounting of the guide piece 7 to the lower rail. Instead of providing a J-shaped locking recess as shown in FIG. 3e, for receiving the additional positioning pin 80 and locking it in x-direction, a circular locking recess may be provided in the base leg (side-wall) of the lower rail. The additional positioning pin 80 may serve for assisting in defining the position of the guide piece 7 relative to the first rail in the longitudinal direction x also in a central portion of the guide piece 7. FIGS. 5c and 5d show details of a second modification to the guide piece 7 according to the first embodiment of the present invention, which generally is of similar configuration and functionality as the embodiment of FIGS. 5a and 5b.

Figure 5G:
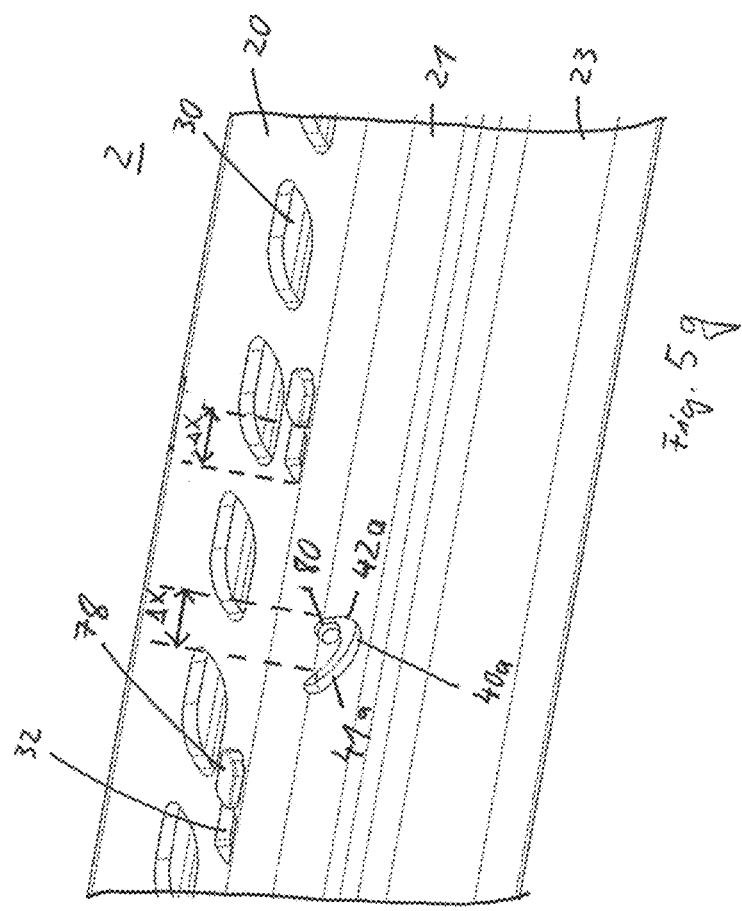
FIG. 5g shows details of the mounting of the guide piece of FIGS. 5e and 5d to a lower rail according to a further embodiment of the present invention.
Figure 5F:
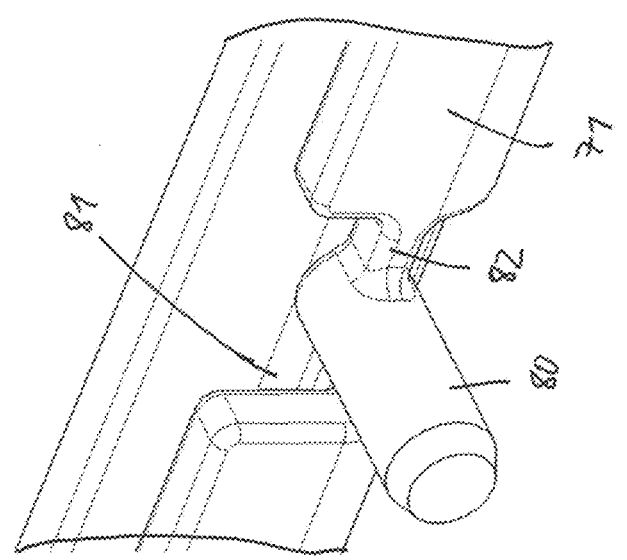

According to the present invention, the additional positioning pin 80 may also extend in a direction different to the vertical direction (z). As an example, FIGS. 5e-5f show details of a third modification to the guide piece 7 according to the first embodiment of the present invention. Here, the additional positioning pin 80 is disposed in a window 81 of the main body 70 and connected via a flexible connecting portion 82 to the main body, to enable a bending of the flexible connecting portion 82 in y- and/or x-direction when mounting of the guide piece 7 to the lower rail. As shown in FIGS. 5e and 5f, the additional positioning pin 80 extends in the y-direction and thus may serve for additionally locking the position of the guide piece 7 relative to the lower rail in the vertical direction (z). As shown in FIG. 5g, in the mounted condition of the guide piece, the additional positioning pin 80 is locked in a locking groove 42a extending in z-direction and provided in the vertical L-leg 21 of the lower rail 2, which is directly adjacent to the base leg 20 of the lower rail 2. As shown in FIG. 5g, the locking groove 42a is part of a J-shaped locking recess 40a of similar shape and function as described above with reference to FIG. 3e and FIGS. 4a-4f for the locking recess 40. Thus, the J-shaped locking recess 40a is formed by the locking groove 42a and an insertion and guiding groove 41a extending under an acute angle relative to the locking groove 42a. The sliding and locking of the additional positioning pin 80 in the locking recess 40a is similar to the process described above with reference to FIG. 3e and FIGS. 4a-4f for the locking recess 40, so that further details may be omitted.

FIG. 6a shows a guide piece 7 according to a second embodiment of the present invention in a side view, which is bow-shaped in a relaxed home position, if viewed in a side view. More specifically, that side of the main body 70 that faces the inner surface of the base leg of the lower rail in the mounted condition and that is provided with the plurality of T-shaped retention heads 78 is the concave inner side of the bow-shaped guide piece 7 in the relaxed home position. The positioning pins 74 at the front and rear end of the guide piece 7 are provided on the same side of the main body as the retention heads 78. Thus, the guide piece 7 is uniformly bent in a bow-shape in the xz-plane. For mounting such a guide piece 7 to a lower rail, the guide piece is first bent in the xz-plane until it takes a linear configuration, in which the positioning pins 74 and retention heads are aligned in x-direction and can be inserted in the same manner as outlined above with reference to FIGS. 4a and 4b into grooves in the side-wall of the lower rail. Then, the guide piece 7 is displaced in x-direction by the predetermined distance Δx, until reaching the fully mounted condition shown in FIGS. 4e and 4f. Due to the inherent resiliency of the guide piece 7 and its bow-shape in the relaxed home position, the guide piece 7 will be permanently biased toward the lower fail in the fully mounted condition. Here, the guide piece 7 will be locked in z-direction to the lower rail by the positive-fit of the retention heads 78 in the locking slots of the lower rail.

In the following, a guide piece according to a second embodiment of the present invention and a process for mounting such a guide piece to a lower rail will be described with reference to FIGS. 8a to 8g. As can be seen particularly in FIGS. 8b, 8e and 8f, the connecting devices are formed as J-shaped hook-like members 79, each having a stem 77 extending in a direction perpendicular to the main body 70 and a retention head 79 extending perpendicular to the stem 77 and in parallel with the main body 70. The front end of each retention head 79 has an inwardly slanted surface, to assist the retention head 79 in sliding onto the rear side of the base leg of the lower rail in the initial stage of mounting the guide piece to the lower rail. As shown in FIG. 8b, the J-shaped retention heads 79 are provided on a side of the main body 70 facing the inner surface of the base leg of the lower rail and serve as connecting devices for connecting the guide piece 7 with the lower rail. The retention heads 79 are formed at positions corresponding to the locations of mounting recesses 44 formed in the base leg 20 of lower rail 2 (cf. FIG. 8a). Preferably, the retention heads 79 and the mounting recesses 44 are formed at equidistant spacings. A plurality of rectangular windows or recesses 73 are provided in the side-walls 71 at the positions of the stems 77. As can be concluded from a comparison of FIGS. 8a and 8b, the shape and base area of the mounting recesses 44 corresponds to the shape and base area of the retention heads 79 including the stems 77. In the example shown in the drawings, the retention head 79 has a rectangular shape. However, the present invention is not delimited to this shape, and the retention head 79 may have any other hook-like shape suited to lock the guide piece 7 in vertical direction at the lower rail.

As shown in FIG. 8b, the retention heads 79 protrude by a length Δx in x-direction beyond the stems 77. For mounting the guide piece to the lower rail, the guide piece 7 is lowered from vertically above onto the base leg 20 of the lower rail, until the plurality of retention heads 79 are inserted into the mounting recesses 44 and the inner surface of the base leg 20 gets in contact with the upper ends of the side-walls 71. Then, the guide piece 7 is displaced by a length Δx in x-direction (hereinafter also referred to as the "predetermined distance"), until the stems 77 abut against the rear ends of the mounting recesses 44. Thus, when the guide piece 7 is mounted to the lower rail 2, the retention heads 79 each grip behind the base leg 20 at a location offset relative to the mounting recesses 44 in the longitudinal direction x by the predetermined distance Δx.

As shown in FIG. 7b, a positioning pin 74 is provided at the front and/or rear end of the guide piece 7, which is in this case of cylindrical shape and will be locked in the circular recess 43 in the base leg 20 in the mounted condition of the guide piece 7 only in y-direction, transverse to the longitudinal direction x, due to the resilient biasing force exerted by the flexible connecting portion 76. Thus, the positioning pin 74 is reversibly received in the circular recess 43, so that the guide piece 7 may also be separated again from the lower rail, e.g. for replacement or repairing purposes, by performing the above steps in reverse order.

FIGS. 6b-6c show two different stages of mounting the guide piece 7 according to FIG. 8b to a lower rail 2. In the stage of FIG. 6b the retention heads 79 are already fully inserted into the mounting recesses 44 and the guide piece 7 has been displaced already slightly into the longitudinal direction so that the front ends of the retention heads 79 start gripping behind the base leg 20 of the lower rail. At this stage the cylindrical positioning pin 74 cannot be received yet in the circular recess 43. Rather, the front end of the cylindrical positioning pin 74 abuts against the inner surface of base leg 20 so that the flexible connecting portion 76 is bent in vertical direction. When the guide piece 7 is displaced further into the x-direction, finally the cylindrical positioning pins 74 reach the locations of the circular recesses 43 so that the flexible connecting portions 76 will bend back into their relaxed home positions and push the cylindrical positioning pins 74 into the circular recesses 43, as shown in FIG. 6c. In the fully mounted condition of the guide piece 7 the cylindrical positioning pins 74 prevent a displacement of the guide piece 7 into the longitudinal direction x without clearance. Furthermore, as the stems 77 are tightly fit into the mounting recesses 44, the guide piece 7 is also held without clearance in y-direction at the lower rail 2. Furthermore, as the distance between the main body 70 of the guide piece 7 and each of the J-shaped retention heads 79 corresponds to a thickness of the base leg 20, the guide piece 7 is also held without clearance in z-direction at the lower rail 2. FIG. 8g shows in a cross-sectional view details of this fully mounted condition of the guide piece to the lower rail.

Of course, according to further embodiments according to the present invention, the positioning pins 74 may also be locked in z-direction in the locking grooves 42, e.g. be snap-fitted into the locking grooves 42 or locking holes provided in the base leg of the lower rail.

FIG. 8d shows a modified embodiment of a lower rail, comprising a guiding slot 40 of similar shape and function as described above with reference to FIG. 3e is provided at the front and/or rear end of the base leg 20. More specifically, the guiding slot 40 comprises a locking groove 42 extending in y-direction and an insertion groove 41 extending under an acute angle relative to the locking groove 42 in a direction away from the guide piece and toward an end of the lower rail 2, e.g. the front end of the lower rail 2. The distance between the front end of the insertion groove 41 and the locking groove 42 in x-direction corresponds to the afore-mentioned predetermined distance Δx, which corresponds to the length by which the guide piece is displace in longitudinal direction x when mounting the guide piece to the lower rail. Thus, according to this embodiment, the positioning pins 74 are inserted into the guiding slots 40 and slide into the locked position in the same manner as described above in detail with reference to FIGS. 4a-4f, so that it is not necessary to repeat a detailed description.

FIGS. 9a-9c show further variants to a guide piece according to the present invention. As shown in FIG. 9a, the front end of the positioning pin 74 is mushroom-shaped and comprises an expanded cap 74a which is beveled outwards. The cap 74a is flexible, and if inserted into a circular opening, it will be compressed and flap back towards the pin 74. In the fully mounted condition of the guide piece, the cap 74a will resiliently flap back towards the relaxed condition shown in FIG. 9a, in which the cap 74a will grip behind the base leg of the lower rail, to secure the positioning pin 74 also in z-direction.

In the embodiment of FIG. 9b, a hook-shaped locking member 79b is formed at the end of each of the J-shaped retention heads 79, which reduces the distance between the upper surface of the main body 70 and the rear side of the retention head 79 slightly. In the fully mounted condition of the guide piece, the hook-shaped locking members 79b are received in locking grooves (not shown) provided on the inner surface of the base leg of the lower rail at locations adjacent the respective mounting recesses 44 (cf. FIG. 8c), to thereby additionally lock the guide piece 7 in the longitudinal direction x.

As shown in FIG. 9c, similar hook-shaped locking member 78a may also be provided at the T-shaped retention heads 78, e.g. along the longitudinal sides, to thereby additionally lock the guide piece 7 in the longitudinal direction x in the fully mounted condition of the guide piece.

Hereinafter, a method for assembly of an adjusting device for longitudinal adjustment of a vehicle seat as outlined above will be outlined.

In a first step a first (e.g. lower) rail 2, a second (e.g. upper) rail 1 and possibly also an oblong retainer 6 for accommodating bearing members are provided.

In a next step a guide piece as outlined above will be provided. The guide piece is then mounted to the inner surface of a side-wall of the lower rail, as outlined above.

In a next step, the lower rail is then slightly expanded by means of a mounting device so that the upper rail (possibly together with the oblong retainer and bearing members if required) can be inserted in longitudinal direction into the expanded lower rail, to thereby mate the lower and upper rail and obtain an adjusting device for longitudinal adjustment of a vehicle seat.

As will become apparent to the person skilled in the art, additional method steps, such as providing end stops or bending of such end stops, may be provided in this method.

According to the present invention, the process of mounting the guide piece to the guide rail is less time consuming and requires less expensive equipment, particularly because no ultrasonic welding equipment is required. Rather, the guide piece may be mounted by simply inserting the retention heads into corresponding mounting recesses provided in the lower rail and displacing the guide piece a little in longitudinal direction, until the positioning pins are received in corresponding positioning grooves, to lock the position of the guide piece relative to the lower rail in longitudinal direction. This purely mechanical solution is also environmentally friendly, because no large amount of electricity is required anymore and suction of burned plastic gases etc. is not required. A significant advantage of the present invention is a significantly reduced scrap rate of the mounting process as the guide piece may be mounted with high precision and reliably. Thus, the solution according to the present invention further assists in reducing the overall costs of adjusting devices for longitudinal adjustment of a vehicle seat.

If a guide piece should get damaged during use, according to the present invention it can be easily replaced in vehicle. The mounting of the guide piece to the lower rail according to the present invention also enables a replacement of a damaged guide piece in adjusting devices.

As will become apparent to the person skilled in the art, instead of providing the hook-shaped guiding slot (cam guide groove) in the base leg of the lower rail as outlined above particularly with reference to FIGS. 3a-3f and the mounting process of FIGS. 4a-4f, a similar guiding slot (cam guide groove) may also be provided on the guide piece, while the positioning (locking) pin may be provided on the lower rail instead. The mounting process itself will be similar as outlined above with reference to FIGS. 4a-4f for such an alternative embodiment, so that a detailed description may be omitted.

As will become apparent to the person skilled in the art, the above memory module of the adjusting device may of course be combined with a conventional "easy entry" mechanism, such as the mechanism of the Applicant disclosed in U.S. Pat. No. 7,097,250 B2 or U.S. Pat. No. 10,046,674 B1.

LIST OF REFERENCE NUMERALS 1 upper rail
2 lower rail
3 rail/adjusting device for longitudinal adjustment
4 linear guide
5 linear guide
6 retainer
7 guide piece
10 base leg
11 L-leg
12 first connecting leg
13 second (slanted) connecting leg
14 bending portion
15 first end portion
16 third connecting leg
17 second end portion/bearing leg
20 base leg
21 L-leg
22 first (slanted) connecting leg
23 second (slanted) connecting leg
24 third connecting leg
25 first end portion
26 fourth connecting leg
27 fifth connecting leg
28 sixth connecting leg
29 second end portion
30 locking recess
31 mounting recess
32 insertion opening
33 locking slot
34 transition region
40 guiding slot for positioning pin 74
40a guiding slot for additional positioning pin 80
41 insertion groove
41a insertion portion
42 locking groove
42a locking portion
43 slot for positioning pin 74
44 insertion opening for J-shaped retention head 79
62 side-wall of retainer 6
70 main body
70a glide surface
71 side-wall
72 channel
73 recess in side-wall 71
73a clearance
74 positioning pin
74a hook-shaped portion of positioning pin 74
75 collar
76 connecting portion
77 stem
78 T-shaped retention head
78a hook-shaped portion of T-shaped retention head 78
79 J-shaped retention head
79a beveled end surface of head 79
79b hook
80 additional positioning pin
81 slot
82 additional connecting portion
83 additional connecting portion
x longitudinal direction
y transverse direction
z vertical direction
Δx predetermined distance
200 lower rail
201 base leg of lower rail 200
202 locking recess
203 hole
204 hole
210 guide piece
211 main body
212 post for mounting
212' head of post 212 after welding
213 locator pin

What is claimed is:

1. An adjusting device for longitudinal adjustment of a vehicle seat, comprising:
a first rail provided with a side-wall having an inner surface and an outer surface, defining a plurality of locking recesses and a positioning recess;
a second rail, which is movably guided in a longitudinal direction relative to the first rail; and
a guide piece mounted to the side-wall of the first rail; wherein
the guide piece comprises:
a main body extending in the longitudinal direction,
a plurality of connecting devices provided on a side of the main body facing the inner surface of the side-wall of the first rail and connecting the guide piece to the first rail, and
a positioning device configured to be locked in the positioning recess, for positioning the guide piece with respect to the first rail in the longitudinal direction; wherein
the connecting devices are formed as hook-like members that are inserted through the locking recesses and grip behind the side-wall such that the guide piece is fixed to the first rail, the guide piece further comprises a flexible portion connected to the positioning device and the main body, and the flexible portion is configured to bend in a direction transverse to the longitudinal direction when mounting the guide piece to the side-wall and to be locked in the positioning recess such that the hook-like members grip behind the side-wall.

2. The adjusting device for longitudinal adjustment of a vehicle seat as claimed in claim 1, wherein the locking recesses each comprise an insertion opening of a base area corresponding to a base area of the connecting devices, and the hook-like members grip behind the side-wall at locations offset relative to the insertion openings in the longitudinal direction by a predetermined distance.

3. The adjusting device for longitudinal adjustment of a vehicle seat as claimed in claim 2, wherein the hook-like members each have a T-shaped cross-section, if viewed in the longitudinal direction, each of the insertion openings is followed by a locking slot of a width less than a width of the base area of the insertion openings, and the hook-like members grip behind the side-wall at the locking slots.

4. The adjusting device for longitudinal adjustment of a vehicle seat as claimed in claim 3, wherein the hook-like members each comprise a stem of a width corresponding to a width of the locking slots and a retention head of a width larger than a width of the locking slots, wherein a distance between the main body of the guide piece and each of the retention heads corresponds to a thickness of the side-wall.

5. The adjusting device for longitudinal adjustment of a vehicle seat as claimed in claim 2, wherein the hook-like members each have a stem extending in a direction perpendicular to the main body and a retention head extending perpendicular to the stem and in parallel with the main body, and the retention head of each of the hook-like members grips behind the side-wall at a location offset relative to the insertion openings in the longitudinal direction by the predetermined distance.

6. The adjusting device for longitudinal adjustment of a vehicle seat as claimed in claim 5, wherein a distance between the main body of the guide piece and each of the retention heads corresponds to a thickness of the side-wall.

7. The adjusting device for longitudinal adjustment of a vehicle seat as claimed in claim 5, wherein a hook-shaped locking member is formed at the end of each of the retention head, which is received in a locking groove provided in the side-wall adjacent the respective insertion opening.

8. The adjusting device for longitudinal adjustment of a vehicle seat as claimed in claim 1, wherein the plurality of connecting devices and the at least one positioning device are aligned to each other in the longitudinal direction, and the at least one positioning recess comprises a locking groove extending in a direction transverse to the longitudinal direction, for locking the at least one positioning device in the at least one positioning recess and preventing a displacement of the guide piece in the longitudinal direction.

9. The adjusting device for longitudinal adjustment of a vehicle seat as claimed in claim 8, wherein the at least one positioning recess further comprises an insertion groove extending under an acute angle relative to the locking groove in a direction away from the guide piece, a vertex being formed at a region of intersection between the insertion groove and the locking groove.

10. The adjusting device for longitudinal adjustment of a vehicle seat as claimed in claim 2, wherein the plurality of connecting devices and the at least one positioning device are aligned to each other in the longitudinal direction, and the at least one positioning recess comprises a locking groove extending in a direction transverse to the longitudinal direction, for locking the at least one positioning device in the at least one positioning recess and preventing a displacement of the guide piece in the longitudinal direction, wherein the at least one positioning recess further comprises an insertion groove extending under an acute angle relative to the groove in a direction away from the guide piece, a vertex being formed at a region of intersection between the insertion groove and the locking groove, and a distance between the insertion groove and the locking groove corresponds to the predetermined distance.

11. The adjusting device for longitudinal adjustment of a vehicle seat as claimed in claim 1, wherein the guide piece further comprises at least one additional positioning device at a position between a front end of the guide piece and a rear end of the guide piece, extending in a direction perpendicular to each of the at least one positioning device, and connecting with the main body via an additional flexible portion, and wherein at least one additional positioning recess is formed in a second side-wall adjacent the side-wall of the first rail, for receiving the at least one additional positioning device defining the position of the guide piece relative to the first rail in the longitudinal direction.

12. The adjusting device for longitudinal adjustment of a vehicle seat as claimed in claim 11, wherein the at least one additional positioning recess comprises a locking groove extending in a direction transverse to the longitudinal direction and an insertion groove extending under an acute angle relative to the additional locking groove and toward the side-wall of the first rail, a vertex being formed at a region of intersection between the insertion groove of the at least one additional positioning recess and the locking groove of the at least one additional positioning recess.

13. The adjusting device for longitudinal adjustment of a vehicle seat as claimed in claim 1, wherein the guide piece is biased toward the inner surface of the side-wall of the first rail and is bow-shaped in a relaxed home position, if viewed in a side view, wherein the side of the main body facing the inner surface of the side-wall of the first rail and being provided with the plurality of connecting devices being a concave inner side of the bow-shaped guide piece in the relaxed home position.

14. The adjusting device for longitudinal adjustment of a vehicle seat as claimed in claim 1, wherein the side of the main body facing the inner surface of the side-wall of the first rail and being provided with the plurality of connecting devices is a rear side of the guide piece and wherein a front side opposite to the rear side of the guide piece is provided with a glide surface directed to an inner volume of the adjusting device.

15. A method for assembly of an adjusting device for longitudinal adjustment of a vehicle seat, comprising:

providing a first rail comprising a side-wall having an inner surface and an outer surface and comprising a plurality of locking recesses formed in the side-wall and at least one positioning recess;
providing a second rail;
providing a guide piece comprising a main body, a plurality of connecting devices provided on a side of the main body and at least one positioning device connected with the main body via a flexible portion;
mounting the guide piece to the inner surface of the side-wall; and
inserting the first rail into the second rail for finalizing the adjusting device for longitudinal adjustment of a vehicle seat; wherein
the step of mounting the guide piece to the inner surface of the side-wall comprises:
inserting the hook-like members into the locking recesses and displacing the guide piece relative to the first rail in the longitudinal direction while bending each flexible portion in a direction transverse to the longitudinal direction, until the hook-like members grip behind the side-wall and each of the at least one positioning device is locked in a positioning recess, for defining the position of the guide piece relative to the first rail in the longitudinal direction.

16. The method for assembly of an adjusting device for longitudinal adjustment of a vehicle seat as claimed in claim 15, wherein
the step of providing the first rail comprises providing the locking recesses so that the locking recesses each comprise an insertion opening of a base area corresponding to a base area of the connecting devices; and
in the step of displacing the guide piece relative to the first rail in the longitudinal direction the guide piece is displaced relative to the first rail in the longitudinal direction by a predetermined distance so that the hook-like members grip behind the side-wall at locations offset relative to the insertion openings in the longitudinal direction by the predetermined distance.

17. The method for assembly of an adjusting device for longitudinal adjustment of a vehicle seat as claimed in claim 16, wherein
the step of providing the first rail further comprises forming locking slots so that each of the insertion openings is followed by a locking slot of a width less than a width of the base area of the insertion openings;
the step of providing the guide piece further comprises forming the hook-like members so that the hook-like members each have a T-shaped cross-section, if viewed in the longitudinal direction, and each comprise a stem of a width corresponding to a width of the locking slots and a retention head of a width larger than a width of the locking slots; and
in the step of displacing the guide piece relative to the first rail in the longitudinal direction the guide piece is displaced relative to the first rail in the longitudinal direction by the predetermined distance so that the retention head of each of the hook-like members grips behind the side-wall at the location of a locking slot.

18. The method for assembly of an adjusting device for longitudinal adjustment of a vehicle seat as claimed in claim 16, wherein
the step of providing the guide piece further comprises forming the hook-like members so that the hook-like members each have a stem extending in a direction perpendicular to the main body and a retention head extending perpendicular to the stem and in parallel with the main body; and
in the step of displacing the guide piece relative to the first rail in the longitudinal direction the guide piece is displaced relative to the first rail in the longitudinal direction by a predetermined distance so that the retention head of each of the hook-like members grips behind the side-wall at a location offset relative to the insertion openings in the longitudinal direction by the predetermined distance.

19. The method for assembly of an adjusting device for longitudinal adjustment of a vehicle seat as claimed in claim 16, wherein
the step of providing the guide piece further comprises forming the plurality of connecting devices and the at least one positioning device so that the plurality of connecting devices and the at least one positioning device are aligned to each other in the longitudinal direction; and
the step of providing the first rail further comprises forming the at least one positioning recess so that the at least one positioning recess comprises a locking groove extending in a direction transverse to the longitudinal direction; wherein
in the step of mounting the guide piece to the inner surface of the side-wall each flexible portion is bent in a direction in parallel with a direction of the locking groove, and
after displacing the guide piece relative to the first rail in the longitudinal direction by the predetermined distance each of the at least one positioning device slides into the locking groove, for defining the position of the guide piece relative to the first rail in the longitudinal direction.

20. The method for assembly of an adjusting device for longitudinal adjustment of a vehicle seat as claimed in claim 19, wherein
the step of providing the first rail further comprises forming the at least one positioning recess so that the at least one positioning recess further comprises a locking groove extending in a direction transverse to the longitudinal direction and so that a distance between the insertion groove and the locking groove corresponds to the predetermined distance;
the step of mounting the guide piece to the inner surface of the side-wall further comprises inserting each of the at least one positioning device into an insertion groove; and
in the step of displacing the guide piece relative to the first rail in the longitudinal direction each of the at least one positioning device slides in the insertion groove while bending each flexible portion in a direction transverse to the longitudinal direction until each of the at least one positioning device enters the locking groove.

21. A guide piece for an adjusting device for longitudinal adjustment of a vehicle seat in a longitudinal direction, configured to be mounted to an inner surface of a side-wall of the adjusting device having a plurality of locking recesses and a positioning recess, said guide piece comprising:
a main body extending in the longitudinal direction,
a plurality of connecting devices provided on a side of the main body, for connecting the guide piece to the side-wall of the adjusting device,
a positioning device configured to be locked in the positioning recess in the side-wall of the adjusting device, for positioning the guide piece with respect to the side-wall in the longitudinal direction, and
a flexible portion connected to the positioning device and the main body; wherein the connecting devices are formed as hook-like members configured to grip behind the side-wall when inserted through the locking recesses, and the flexible portion is configured to bend in a direction transverse to the longitudinal direction and to return to a home position, so that the guide piece can be detachably fixed to the side-wall of the adjusting device.

\* \* \* \* \*